United States Patent
McCorkle et al.

(10) Patent No.: US 12,153,149 B2
(45) Date of Patent: Nov. 26, 2024

(54) MULTIPORT DF ANTENNAS AND DF SYSTEMS

(71) Applicant: Applied Signals Intelligence, Inc., Sterling, VA (US)

(72) Inventors: John W. McCorkle, Vienna, VA (US); Timothy R. Miller, Arlington, VA (US)

(73) Assignee: Applied Signals Intelligence, Inc., Sterling, VA (US)

( * ) Notice: Subject to any disclaimer, the term of this patent is extended or adjusted under 35 U.S.C. 154(b) by 469 days.

(21) Appl. No.: 17/038,600

(22) Filed: Sep. 30, 2020

(65) Prior Publication Data

US 2021/0098881 A1 Apr. 1, 2021

Related U.S. Application Data

(60) Provisional application No. 62/908,208, filed on Sep. 30, 2019.

(51) Int. Cl.
*G01S 3/72* (2006.01)
*G01S 3/04* (2006.01)
(Continued)

(52) U.S. Cl.
CPC .......... *G01S 3/72* (2013.01); *G01S 3/043* (2013.01); *G01S 3/10* (2013.01); *G01S 3/46* (2013.01); *H01Q 3/34* (2013.01); *H01Q 9/045* (2013.01)

(58) Field of Classification Search
CPC ... G01S 3/043; G01S 3/10; G01S 3/46; G01S 3/146; G01S 3/72; G01S 5/06; H01Q 9/045; H01Q 9/28
(Continued)

(56) References Cited

U.S. PATENT DOCUMENTS

| 4,443,802 A | 4/1984 | Mayes |
| 5,315,308 A | 5/1994 | Nehorai et al. |

(Continued)

FOREIGN PATENT DOCUMENTS

| CN | 109428167 A | * | 3/2019 | ............... H01Q 1/38 |
| WO | 0069198 A1 | | 11/2000 | |
| WO | 2000069198 | | 11/2000 | |

OTHER PUBLICATIONS

Lee Young, U.S. International Searching Authority, International Search Report and Written Opinion, corresponding PCT Application No. PCT/US2020/053453, mailed Feb. 9, 2021, 25 pages total.

(Continued)

*Primary Examiner* — Chuong P Nguyen
(74) *Attorney, Agent, or Firm* — DiBerardino McGovern IP Group LLC

(57) ABSTRACT

A multi-port antenna and associated systems having extremely wide bandwidth and capable of maintaining directivity as frequency decreases and is made arbitrarily low, allowing DF systems to operate to arbitrarily low frequency regardless of size. Construction may be rugged, lightweight, and low cost, allowing reliable service in harsh environments. The systems allow utilization of both the E and H fields occupying a common area of space. The disclosed DF system takes advantage of knowledge of the as-installed array manifold, uses pattern matching to determine the angle of arrival (AoA) of incoming waves, and enhances sensitivity by using integration on cross-correlation products between the multiple ports to achieve SNR improvement.

13 Claims, 10 Drawing Sheets

(51) Int. Cl.
    *G01S 3/10*         (2006.01)
    *G01S 3/46*         (2006.01)
    *H01Q 3/34*        (2006.01)
    *H01Q 9/04*        (2006.01)

(58) Field of Classification Search
    USPC .................................................. 342/445, 417
    See application file for complete search history.

(56) References Cited

U.S. PATENT DOCUMENTS

| | | | |
|---|---|---|---|
| 5,402,132 A * | 3/1995 | Hall ....................... | H01Q 21/29 |
| | | | 343/729 |
| 5,768,477 A | 6/1998 | Johnson et al. | |
| 6,067,053 A | 5/2000 | Runyon | |
| 6,329,955 B1 | 12/2001 | McLean | |
| 6,424,309 B1 | 7/2002 | Johnston | |
| 6,515,632 B1 | 2/2003 | McLean | |
| 6,963,301 B2 | 11/2005 | Schantz | |
| 7,388,550 B2 * | 6/2008 | McLean .................... | H01Q 1/38 |
| | | | 343/739 |
| 8,179,328 B2 * | 5/2012 | Brown .................... | H01Q 13/04 |
| | | | 343/773 |
| 8,253,626 B2 | 8/2012 | Schantz | |
| 9,279,880 B2 * | 3/2016 | McCorkle ................. | G01S 5/06 |
| 9,482,735 B2 * | 11/2016 | Sharawi .................... | G01S 3/48 |
| 9,880,260 B2 * | 1/2018 | McCorkle ............... | G01S 3/146 |
| 10,468,782 B1 | 11/2019 | Steinbrecher | |
| 10,665,956 B2 * | 5/2020 | Li .......................... | H01Q 3/36 |
| 10,794,984 B2 * | 10/2020 | Rappaport ............... | G01S 3/48 |
| 10,859,664 B2 * | 12/2020 | Bowden .................. | G01S 3/043 |
| 10,873,137 B2 | 12/2020 | Kossin | |
| 11,217,048 B2 | 1/2022 | Stitt | |
| 11,539,123 B2 * | 12/2022 | Hu ......................... | H01Q 5/385 |
| 2016/0018509 A1 | 1/2016 | McCorkle | |
| 2016/0103199 A1 | 4/2016 | Rappaport | |
| 2016/0146923 A1 * | 5/2016 | Mccorkle ................. | H01Q 9/28 |
| | | | 342/442 |
| 2019/0214721 A1 | 7/2019 | Hu et al. | |
| 2022/0336945 A1 | 10/2022 | McCorkle et al. | |
| 2024/0019519 A1 | 1/2024 | McCorkle | |

OTHER PUBLICATIONS

Introduction into Theory of Direction Finding, 2011-2012 Rhode Schwarz catalog Radiomonitoring & Radiolocation.
Paul Denisowski, A comparison of radio direction-finding technologies, Rohde & Schwarz.
R&S ADDx Multichannel DF Antennas Product Overview, Version 4.00, Sep. 2013.
W. Read, Review of Conventional Tactical Radio Direction Finding Systems, Communications Electronic Warfare Section, Electronic Warfare Division, Defense Research Establishment Ottawa, Technical Note 89-12, May 1989.
Sathish Chandran, Editor, Advances in Direction-of-Arrival Estimation, Artech House 2006, Norwood Mass. ISBN-10:1-59693-004-7.
Lan-Mei Wang, Gui-Bao Wang, Cao Zeng, "Mutual Coupling Calibration for Electro-Magnetic Vector Sensor." Progress In Electromagnetics Research B, vol. 52, pp. 347-362, 2013.
Oger M., Marie F., Lemur D., Le Bouter G., Erhel Y., Bertel L., "A method to calibrate HF receiving antenna arrays." IEE Ionospheric Radio Techniques Symposium, London: United Kingdom (2006).
Cecconi, B., and P. Zarka (2005), "Direction finding and antenna calibration through analytical inversion of radio measurements performed using a system of two or three electric dipole antennas on a three-axis stabilized spacecraft." Radio Sci., 40, RS3003, doi:10. 1029/2004RS003070.
Baum, C. E., "Some Characteristics of Electric and Magnetic Dipole Antennas for Radiating Transient Pulses." AFWL Sensors and Simulation Notes 125 (Jan. 1971).

J. S. Yu, C-L James Chen, and C. E. Baum, "Multipole Radiations: Formulation and Evaluation for Small EMP Simulators." Sensor and Simulation Notes 243 (Jul. 1978).
E. G. Farr and J. Hofstra, "An Incident Field Sensor for EMP Measurements." Electromagnetic Compatibility, IEEE Trans. on, May 1991, 105-13, Also published as Sensor and Simulation Notes 319 (Jul. 1989).
Baum C. E., "General properties of antennas." Electromagnetic Compatibility, IEEE Transactions on, vol. 44, No. 1, pp. 18-24, Feb. 2002 doi: 10.1109/15.990707. Also Sensor and Simulation Notes 330 (Jul. 1991).
F. M. Tesche, "The PxM Antenna and Applications to Radiated Field Testing of Electrical Systems, Part 1, Theory and Numerical Simulations." Sensor and Simulation Notes 407 (Jul. 1997).
F. M. Tesche, T. Karlsson, and S. Garmland, "The PxM Antenna and Applications to Radiated Field Testing of Electrical Systems, Part 2, Experimental Considerations." Sensor and Simulation Notes 409 (Jul. 1997).
E. G. Farr, C. E. Baum, W. D. Prather, and T. Tran, "A Two-Channel Balanced-Dipole Antenna (BDA) With Reversible Antenna Pattern Operating at 50 Ohms" Sensor and Simulation Notes 441 (Dec. 1999).
McLean, J., H. Foltz, and R. Sutton. "Conditions for Direction-Independent Distortion in UWB Antennas." Antennas and Propagation, IEEE Transactions on 54, No. 11 (Nov. 2006): 3178-83. doi:10.1109/TAP.2006.883956.
Mayes, P. E., W. Warren, and F. Wiesenmeyer. "The Monopole Slot: a Small Broad-Band Unidirectional Antenna." Antennas and Propagation, IEEE Transactions on 20, No. 4 (Jul. 1972): 489-93. doi:10.1109/TAP.1972.1140250.
McLean, J., and R. Sutton. "Practical Realization of PxM Antennas for High-Power, Broadband Applications." In Ultra-Wideband, Short-Pulse Electromagnetics 7, Chapter 30, edited by Frank Sabath, EricL. Mokole, Uwe Schenk, and Daniel Nitsch, 267-75. Springer New York, 2007.
Schroeder, K., and K. Soo Hoo. "Electrically Small Complementary Pair (ESCP) with Interelement Coupling." Antennas and Propagation, IEEE Transactions on 24, No. 4 (Jul. 1976): 411-18. doi:10. 1109/TAP.1976.1141376.
A. Nehorai and E. Paldi, "Vector-sensor array processing for electromagnetic source localization," IEEE Transactions on Signal Processing, vol. 42, No. 2, pp. 376-398, Feb. 1994, doi: 10.1109/ 78.275610.
S. Cai, G. Wang, J. Zhang, K.-K. Wong, and H. Zhu, "Efficient direction of arrival estimation based on sparse covariance fitting criterion with modeling mismatch," Signal Processing, vol. 137, pp. 264-273, Aug. 2017, doi:10.1016/j.sigpro.2017.02.011.
J. Duplouy, "Wideband Reconfigurable Vector Antenna for 3-D Direction Finding Application," Ph.D., Electromagnetism. Institut National Polytechnique de Toulouse, INP Toulouse, 2019.
K. Ghaemi, R. Ma, and N. Behdad, "A Small-Aperture, Ultrawideband HF/VHF Direction-Finding System For Unmanned Aerial Vehicles," IEEE Transactions on Antennas and Propagation, vol. 66, No. 10, pp. 5109-5120, Oct. 2018, doi: 10.1109/TAP.2018.2858210.
H. Krim and M. Viberg, "Two decades of array signal processing research: the parametric approach," IEEE Signal Processing Magazine, vol. 13, No. 4, pp. 67-94, Jul. 1996, doi: 10.1109/79.526899.
Y. L. Minghui Li and B. He, "Array Signal Processing for Maximum Likelihood Direction-of-Arrival Estimation," Journal of Electrical & Electronic Systems, vol. 3, No. 1, pp. 1-5, 2014, doi: 10.4172/2332-0796.1000117.
B. Ottersten, M. Viberg, and T. Kailath, "Analysis of subspace fitting and ML techniques for parameter estimation from sensor array data," IEEE Transactions on Signal Processing, vol. 40, No. 3, pp. 590-600, Mar. 1992, doi: 10.1109/78.120802.
Paul Denisowski, "An Introduction to Radio Direction Finding Methodologies," [Online]. Available: https://www.rohde-schwarz. com/us/knowledge-center/videos/webinar-an-introduction-to-direction-finding-video-detailpage_251220-761216.html.
E. J. Riley, "Planar Antenna Arrays for Correlation Direction Finding Systems for use on Mobile Platforms," Nov. 2012, Accessed: Dec. 17, 2019. [Online]. Available: https://etda.libraries.psu.edu/ catalog/16222.

(56) References Cited

OTHER PUBLICATIONS

Wei Jiang and A. M. Haimovich, "Cramer-Rao bound and approximate maximum likelihood estimation for non-coherent direction of arrival problem," in 2016 Annual Conference on Information Science and Systems (CISS), Mar. 2016, pp. 506-510, doi: 10.1109/CISS.2016.7460554.

F.-G. Yan, J. Wang, S. Liu, B. Cao, and M. Jin, "Computationally efficient direction of arrival estimation with unknown number of signals," Digital Signal Processing, vol. 78, pp. 175-184, Jul. 2018, doi: 10.1016/j.dsp.2018.03.012.

X. Zhang, M. N. E. Korso, and M. Pesavento, "Maximum Likelihood and Maximum A Posteriori Direction-of-Arrival Estimation in the Presence of SIRP Noise," arXiv: 1603.08982 [cs, math, stat], Mar. 2016, Accessed: Jun. 12, 2019. [Online]. Available: http://arxiv.org/abs/1603.08982.

* cited by examiner

MULTIPORT DF ANTENNAS AND DF SYSTEMS

CROSS-REFERENCE TO RELATED APPLICATIONS

This application is related to U.S. Patent Application No. 62/908,208 filed Sep. 30, 2019, the contents of which are hereby incorporated into this application in their entirety.

FIELD

The disclosed subject matter relates to radio frequency (RF) systems, such as radar, communications, direction finding (DF), multi-input multi-output (MIMO) radar and communication systems, RF metrology, and other applications where antenna arrays or beamforming antennas or antenna systems are used.

BACKGROUND

A key problem of current MIMO and DF antennas, especially when they must operate at low frequencies such as in the 2-32 MHz HF (high frequency) band or lower, is that they have a large physical size, weight, power consumption, and cost (SWaP-C) plus a long setup time and low sensitivity, and low bandwidth. In addition to, or in combination with these problems, DF systems also require unambiguous, high accuracy angle-of-arrival (AoA) estimation over 360 degrees of coverage, a low antenna-port and receiver-channel count, plus high ruggedness, reliability, and repeatability. For many years and continuing today, the government has published requests for proposals for antennas and DF systems to solve the above list of problems. Many proposals and journal articles from government researchers to university professors to amateur radio operators, have been written attempting to address them but the proposed and resulting antennas are still either far too large, insensitive, narrowband, and fil to address other needs, which makes them unusable for many applications. Moreover, the bandwidth limits of the existing antennas end up requiring wideband systems to use a multiband approach where multiple antennas are used to cover multiple frequency bands. This multiband approach makes wideband systems even bigger, more complex, and more costly.

DF systems, and multi-input multi-output (MIMO) radar and communication systems depend on getting diversity over 360 degrees of coverage and over wide bandwidths from their multi-port antenna systems. DF systems and systems that utilize MIMO antennas and processing require each port to have different information, or effectively, be aiming in different directions, and at the same time, the total power from all the ports needs to provide nearly omnidirectional coverage, thereby providing a rich data set that allows the MIMO and DF methods to achieve high processing gain and high performance over a full 360 degrees of coverage. Thus, it will be appreciated that there is need for an antenna that provides a set of patterns where (1) the patterns from the ports are different from one another and aim at different angles, and (2) the total power from all the ports provides a nominally omni-directional pattern. It will also be appreciated that an antenna is needed that is small and wideband and maintains these attributes across the entire bandwidth.

Particularly at low frequencies, the antenna is so electrically small, that its gain/sensitivity is, by fundamental physics, unavoidably low. Thus, it will be appreciated that a DF method is needed that can achieve high processing gain to mitigate the low antenna gain. It will also be appreciated that an antenna is needed with ports that eliminate all lossy and bandwidth limiting components, like baluns, and allow an extremely low loss and wide bandwidth connection, such as to an ultra-low noise amplifier so as to mitigate the low antenna gain.

In addition to the above problems, another key problem for DF systems is that signals of interest can arrive with unknown or inconsistent polarization, and with extraneous multipath terms. Multipath can arrive from reflectors at angles other than the angle to the RF emitter, and with their polarization rotated or inverted from that of the signal. These multipath terms confuse the estimator and reduce the reliability of its AoA estimate. Thus, it will be appreciated that in order to mitigate problems caused by polarization rotations, the outputs of the antenna system's ports must contain the information required to allow a system to quantify the polarization of an incoming signal. It will be appreciated that an AoA estimation method is needed that can mitigate errors caused by unknown polarization and multipath, fully anticipate the phenomena, and simultaneously estimate not only the signal's AoA, magnitude, and polarization, but the AoA, magnitude, and polarization of multipath terms as well.

Ideally, estimation methods should be unbiased, meaning that, over time, by the law of averages, they converge to the correct answer. But in fact, many estimation methods, and particularly AoA estimation methods, are biased and do not converge to the correct answer. Thus, it will be appreciated that for some applications DF methods are needed that are unbiased, or where the biases are estimated and subtracted, so that the errors they cause are eliminated or generally reduced, respectively.

Another problem for DF systems is the time required to compute the AoA for numerous signals of interest, such as the AoA of each packet from a large number of frequency hopping emitters. Thus, it will be appreciated that for some applications a DF method is needed that can not only mitigate biases, provide processing gain, simultaneously estimate the AoA, magnitude, and polarization, of both line-of-sight and multipath terms, but also be able to be implemented with high enough efficiency and low enough operations count to enable a small portable processor to handle dense frequency hopping environments.

Another problem is that DF processing must work with a set of patterns that go from single broad lobes, to many lobes. The frequency range is so wide that multi-lobe patterns are unavoidable. A frequency range of 400 kHz to 20 GHz, for example, spans a ratio of 50,000 to 1. At the low end, the element spacing and total array length is much too small, while at the high end, the element spacing and total array length is much too big. With a 1 foot (300 mm) long antenna, for example, at 20 GHz the antenna is about 20 wavelengths long and the pattern of each port has many sharp lobes. At 400 kHz the antenna is only $\frac{1}{2500}^{th}$ of a wavelength long, and the pattern of each port has a single broad lobe. As a result of the extreme pattern changes and multiple lobes, standard AoA estimation methods, such as vector-sensor Poynting vector based methods, and standard phased-array methods do not work over the entire frequency span. Thus, it will be appreciated that an AoA estimation system is needed that can achieve high accuracy AoA estimation over a full 360 degrees of coverage with such a wide range of patterns.

Another problem is that man-portable RF emitter sensing systems go through repeated assemble/disassemble, pack/unpack, and launch/land cycles in addition to potential manhandling in between. This manipulation causes difficulty in maintaining construction tolerances and reliable, consistent, and repeatable performance. In practice, even though a RF emitter sensing system might be made to work in a laboratory environment, the harsh environment of a man-portable and small UAV-borne system can cause RF emitter sensing systems to give unreliable results, or to simply stop functioning altogether. Thus, it will be appreciated that an antenna is needed that is robust despite harsh usage.

Given the extraordinarily wide frequency range and the associated wide range of patterns produced by the antenna across that range, and given how the patterns can be significantly modified by different installations, which must all be comprehended by the DF system's estimator system, it will be appreciated that there exists a standard "array manifold" definition that can capture the wide range of patterns, and be used to clearly explain embodiments of a DF estimator system (a) that embrace the dramatic pattern differences across the extraordinarily wide frequency range and span of installations, (b) that has processing gain to address the desire for a system that "operates with enough sensitivity to enable DF on small signals being listened to with nearby standard radio systems with larger antennas", and (c) that "is able to estimate not only a signal's AoA, magnitude, and polarization, but also the AoA, magnitude, and polarization of a number of multipath terms associated with that signal". It should be understood that an array manifold can represent an isolated array, or an "as installed" array. Given its importance in describing various embodiments of the DF system's estimator system, a brief background description for an array manifold is provided here.

An array manifold is an antenna array's transfer function versus AoA and polarization, including a transfer function for each of its ports. An array manifold is a five dimensional (5D) function or matrix that captures the complex output voltage (mag/phase phasor notation for a sine wave cos (2πft) where t=0 is at the center of the array), from the antenna's list of ports, when the antenna receives a standardized 1 V/m field strength electromagnetic (EM) wave, and its ports are terminated with a specified load resistance RL. When expressed as a function, such as M(port, frequency, Az, El, polarization), (5 dimensions for the 5 arguments) the output is the complex output voltage from a given port resulting from an incoming signal with the given frequency, AoA, and polarization. When expressed as a matrix, the matrix as a whole captures the complex output voltages for (a) the array's list of ports, (b) a list of frequencies, a list of AoA (i.e. combinations of (c) azimuth and (d) elevation angles), and (e) two orthogonal polarizations (e.g. horizontal and vertical, or left and right hand circular). In this matrix case, the manifold might be expressed as the 5D matrix $M_{i,f,k,n,pol}$ where the indexes i, f, k, n, pol (5 dimensions) correspond to (i) the port, (f) the frequency, (k) the azimuth, (n) the elevation, and (pol) the polarization. Interpolation between points in the matrix can be used to turn the matrix representation into a smooth functional representation.

It is often convenient to express the set of complex voltages from the set of antenna ports as a vector, at a given frequency, AoA (azimuth and elevation combo), and polarization. For example, a vector, $\bar{v}$ (where the over-bar indicates the variable is a vector) could be defined where its terms are, $$\bar{v} = M_{i,f,k,n,0} \qquad 1$$

where pol=0 indicates the vector is for vertical polarization, and where, for brevity, the f, k, n indexes are "understood" to ultimately take on particular values associated with the context of their use.

Similarly, the vector is sometimes made explicitly a function of the AoA, as in $\bar{v}(\theta_k, \phi_n)$, where its elements are, $$v_i(\theta_k, \phi_n) = M_{f,k,n,0} \qquad 2$$

where, for brevity, the frequency is not explicitly shown but "understood" to take on a particular value associated with the context of its use.

It would therefore be desirable to have a small multi-port antenna that (1) is mass producible, small, light-weight, low-cost, robust and reliable in harsh environments, (2) produces a set of different directivity patterns, one from each port, that taken together as a set, has an uniform omnidirectional total energy level, but is diverse enough to provide information allowing unambiguous and high accuracy determination of a signal's AoA and polarization over a full 360 degrees of coverage, (3) maintains the ability to form such a set of patterns at arbitrarily low frequencies or with an arbitrarily small size (4) does not require lossy or bandwidth limiting networks such as tuning or matching or balun (balanced to unbalanced) networks (5) can be configured such that its port's terminations are coaxial, and (6) is so wideband it eliminates the need for multiple antennas and switches to cover extremely wide bandwidths.

There remains a need for an antenna and DF system that (1) is rugged enough to survive repeated harsh use cycles, (2) is small enough to be handheld or man-wearable (e.g. contained within a backpack or in an operator's clothing), or small and light enough to fly on a miniature unmanned aerial vehicle (UAV), (3) operates across extraordinarily wide bandwidths, such as 500 kHz to 20 GHz, where the pattern from an antenna port can go from a single lobe to many lobes, (4) outputs highly accurate AoA estimates over 360 degrees of coverage in spite of its small size and in spite of the antenna having many lobes at some frequencies, (5) operates with enough sensitivity to use small signals being listened to with a nearby standard radio system using a larger antenna, (6) mitigates both polarization and multipath problems, and is able to estimate not only a signal's AoA, magnitude, and polarization, but also the AoA, magnitude, and polarization of a number of multipath terms associated with that signal, (7) mitigates estimation bias errors and outputs an AoA that is unbiased or that has reduced bias, (8) operates with a small portable processor system that is able to perform (a) the signal analysis required to detect and isolate signals of interest, (b) the AoA estimation process, and in some embodiments (c) the time/history analysis required to (i) estimate range, (ii) associate frequency hop packets with particular emitters in a dense emitter environment with many frequency hopping emitters and report a refined AoA to those emitters, (iii) refine AoA estimates to all RF emitters, and (iv) output other history related statistics such as polarization variability, or the time periods when emitters are active (transmitting) versus inactive (listening), or moving (AoA or magnitude changing) versus stationary, or creating paths showing for example when two emitters are crossing paths (same AoA) versus isolated (different AoA), or estimating a geolocation from these.

SUMMARY

The following presents a concise summary of one or more embodiments in order to provide a basic understanding of the embodiments. This summary is not an extensive overview of all contemplated embodiments and is not intended to identify key or critical elements of all embodiments nor delineate the scope of any or all embodiments. Its sole purpose is to present some concepts of one or more embodiments in a simplified form as a prelude to the more detailed description that is presented later.

According to an aspect of an embodiment, there is disclosed an antenna that provides (1) extremely wide bandwidth, (2) different directive patterns and phase relationships at each port, including at low frequencies where the antenna is electrically small, (3) extremely lightweight yet rugged construction, allowing it to provide long lifetime, highly reliable service in harsh usage such as small boats, backpack environments, unmanned aerial vehicles with harsh launch and recovery environments, and other applications requiring low weight and ruggedness.

According to another aspect of an embodiment, there is disclosed a multiport antenna such that it is mass producible, low cost, and can work reliably in harsh environments or in harsh use, is another objective of the invention according to some embodiments.

According to another aspect of an embodiment, a high bandwidth and small size multiport DF antenna is disclosed. According to an aspect of an embodiment, the antenna can operate from low frequencies where the antenna is extremely electrically small, to high frequencies where the antenna is electrically large. For example, a multiport antenna according to some disclosed embodiments sized similarly to a 6 inch cube can support high accuracy DF across a spectrum covering the high frequency (HF) band where the wavelength can be 200 meters, to beyond 20 GHz where the wavelength is less than 0.5 inch. In other words, in such embodiments, the antenna can simultaneously cover a bandwidth ranging from where the antenna is over 1000 times smaller than a wavelength, to where the antenna is over 10 times bigger than a wavelength. As a result, such an antenna addresses size, weight, and bandwidth needs of many different existing RF systems.

According to another aspect of an embodiment, there is disclosed an antenna comprising a first piece of conductive material and a second piece of conductive material having a substantially planar portion spaced away from and arranged to confront at least a portion of the first piece of conductive material, the first piece of conductive material and the second piece of conductive material together defining a plurality of ports at locations where the first piece of conductive material and the second piece of conductive material come into proximity with each other, each of the plurality of ports having a first terminal in electrical connection with the first piece of conductive material and a second terminal in electrical connection with the second piece of conductive material. The substantially planar portion spaced away from and arranged to confront at least a portion of the first piece of conductive material may be substantially parallel to at least a portion of the first piece of conductive material. Here and elsewhere, the word "may" indicates features are possible rather than restricting covered embodiments to those including one or more of those features.

The antenna may further comprise a third piece of conductive material with the first piece of conductive material and the second piece of conductive material together defining a first plurality of ports at locations where the first piece of conductive material and the second piece of conductive material come into proximity and wherein the third piece of conductive material and the second piece of conductive material together define a second plurality of ports at locations where the third piece of conductive material and the second piece of conductive material come into proximity with each other. The first piece of conductive material and the second piece of conductive material may be arranged in a combination having rotational symmetry about an axis of symmetry and wherein the ports are arranged with respect to one another to be at positions that are rotationally symmetric with respect to the axis. Each port in the plurality of ports may be electrically connected to a respective coaxial connector, with the first terminal being connected to a center conductor of the respective coaxial cable and the second terminal and being connected to a sheath of the respective coaxial connector. The respective coaxial connector may be electrically connected to a coaxial switch that configured to select between different terminations.

According to another aspect of an embodiment, there is disclosed a DF system having an output, the DF system comprising an antenna system comprising at least two ports that sense emissions from an RF emitter, a receiving system, and an estimator system, wherein the antenna system is configured to output a signal from each of its at least two ports and sense a combination of one or more E-field signals and one or more H-field signals from the RF emitter, in a common volume of space, the antenna system comprising M conductive pieces with N ports, each port having two terminals attached to different ones of the two or more conductive pieces, wherein each conductive piece attaches to a terminal from two or more ports, wherein the volume of space enclosed by a current loop through the N ports and two conductive pieces, is in common with the volume of space holding an electric charge between the M conductive pieces. The receiving system may accept signals from the N ports and output a group of signals of interest, each signal of interest having of a set of outputs corresponding to the antenna system's N ports, to the estimator system, at least one of the receiving system and the estimator system being configured to pass signals of interest and reject other signals. The group of signals of interest may include a multipath term as a separate SOI. The estimator system may be adapted to accept the group of signals of interest output by the receiving system and to have access to an array manifold for the signals it accepts, and is further adapted to generate an estimated AoA by finding, for each signal of interest in the group, at least one of the angle in the array manifold that has port voltages most closely matching, according to a matching metric, those from a signal of interest and an estimated range based on how the magnitude of the signal of interest changes, or how the estimated AoA changes, when the DF system and RF emitter move relative to each other over time.

The output of the DF system may communicate at least one of an angle and a range between the antenna system and the RF emitter, as generated by the estimator. At least one of the receiving system and the estimator system may have an input arranged to accept a set isolation parameters including at least one of frequency, frequency set, bandwidth, time duration, time of occurrence, repetition rate, polarization, modulation type, so as to be easily re-configurable. The estimator system may generate an estimated AoA by finding, for a set of signals of interest, one or more angles in the array manifold that would produce port voltages most closely matching, according to a matching metric, those from the set of signals of interest. The estimator system may be adapted to use, e.g., may include an array manifold and be adapted to use a matching process. The estimator system may comprise a neural network trained using the array manifold. The estimator system may be adapted to estimate the AoA, magnitude, and polarization, for two or more multipath waves. The estimator may be adapted to correct for bias. The estimator system may be adapted to correct for bias by arranging for the bias to be estimated as part of the estimating of the AoA, magnitude, and polarization, for each term of a signal arriving from one or more paths. The estimator system is adapted to correct for bias by using a reference signal. The estimator system may comprise at least two parallel processors in parallel, and wherein each processor is tasked to run vectorized operations.

According to another aspect of an embodiment, there is disclosed a multiport antenna comprising two conductive pieces and at least five ports. The five ports may be equally and symmetrically angularly spaced at the vertices of a regular pentagon. The five ports may be in an asymmetrical arrangement not equally angularly spaced. At least one of the two conductive pieces may comprise structure defining at least one slit positioned to control current flow. The multiport antenna may comprise two conductive pieces and seven ports. The multiport antenna may comprise three conductive pieces and ten ports and have a shared conductive surface that is connected to all of the ten ports. The shared conductive surface may be in the form of a bent sheet. The shared conductive surface may be in the form of a rectangular box-like shape. The multiport antenna may comprise ports connecting unshared conductive pieces.

According to another aspect of an embodiment, there is disclosed a DF system comprising a multiport antenna comprising two conductive pieces and at least five ports and an estimator system adapted to generate an estimated AoA. The DF system may further comprise an input adapted to accept a set parameters so as to be easily reconfigurable. The parameters may include one or more of a signal's frequency, frequency set, bandwidth, time duration, time of occurrence, repetition rate, polarization, and modulation type. The parameters may include an array manifold. The estimator system may be adapted to generate an estimated AoA by finding, for a set of signals of interest, a set of angles in an array manifold that would produce port voltages most closely pattern matching, according to a matching metric, those from a set of signals of interest (SoI). The matching may be carried out using a maximum likelihood calculation process. The estimating system may comprise a neural network trained with an array manifold and matching is carried out by the neural network. The set of SoI may include a separate SoI for different multipath terms from a single emitter.

According to another aspect of an embodiment, there is disclosed a multi-port antenna comprising at least two conductive pieces and a plurality of ports connected across the at least two conductive pieces, each of the ports being configured to simultaneously sense multiple EM field components, including (1) E-field components (a) that induce a charge between the two or more conductive pieces relative to each other, or (b) that induce a charge across a metal piece having multiple ports that sense the charge, and (2) H-field components which induce currents to flow through conductive loops (a) that include the ports and at least two conductive pieces arranged to sense the E-field induced charges, such that the ports simultaneously sense H-field induced currents, and (b) that different H-field components flow through. The two or more ports may be configured with coaxial connectors, connected across a pair of conductive pieces.

According to another aspect of an embodiment, there is disclosed a DF system comprising an antenna system that senses EM waves, a receiving system, and an estimator system, wherein the antenna system receives emissions from at least one RF emitter and outputs signals from a set of ports, wherein the receiving system accepts the signals from the set of ports in the antenna system, and outputs a group of signals of interest, each signal of interest having a set of outputs corresponding to the antenna system's set of ports, to the estimator system, wherein the estimator system accepts the set of signals output by the receiving system and generates an estimated AoA of the emissions. The estimator system may receive data from an array manifold matching the antenna system and that covers the signals of interest the estimator system accepts. The estimator system may be adapted to determine an estimated AoA which has reduced bias. The estimator system may be adapted to additionally determine at least one of polarization, magnitude, and SNR for each signal of interest. The estimator system may be adapted to additionally determine polarization, magnitude, and SNR of multipath terms associated with each signal of interest, by determining, for each signal of interest, a combination of angles, magnitudes, and polarizations in an array manifold that generate a set of port voltages most closely matching, according to a matching metric, those from a signal of interest. The estimator system may be adapted to additionally determine an estimated range based on one or both of the amount an estimated magnitude of the signal of interest changed over time, and how the estimated AoA of the signal of interest changed over time, when the DF system and RF emitter move relative to each other over time. The array manifold may comprise a set of data that, given a particular frequency, polarization, and AoA comprised of an azimuth and elevation angle, provides a complex output voltage for each port in the antenna system, given an EM wave arriving with the combination of frequency, polarization and AoA, and wherein the DF system output communicates the AoA generated by the estimator. At least one of the receiving system and the estimator system may be configured to pass signals of interest and reject other signals, According to another aspect of an embodiment, there is disclosed a DF system comprising an antenna system that senses EM waves, a receiving system, and an estimator system, wherein the antenna system may include at least one multi-port antenna comprising at least two conductive pieces and a plurality of ports connected across the at least two conductive pieces, each of the ports being configured to simultaneously sense multiple EM field components, including (1) E-field components (a) that induce a charge between the two or more conductive pieces relative to each other, or (b) that induce a charge across a metal piece having multiple ports that sense the charge, and (2) H-field components which induce currents to flow through conductive loops (a) that include the ports and at least two conductive pieces arranged to sense the E-field induced charges, such that the ports simultaneously sense H-field induced currents, and (b) that different H-field components flow through and wherein the multi-port antenna may have at least two ports configured with coaxial connectors, connected across the at least two conductive pieces, wherein the receiving system may accept the signals from the set of ports in the antenna system, and output a group of signals of interest, each signal of interest having of a set of outputs corresponding to the antenna system's set of ports, to the estimator system, wherein the estimator system may accept the signals output by the receiving system, and generates an estimated AoA by finding, for each signal of interest, or an estimated range based on how the magnitude of the signal of interest changes, and/or how the estimated AoA changes, when the DF system and RF emitter move relative to each other over time, or both, and wherein the DF system output communicates the angles and/or ranges between the antenna system and the RF emitters, generated by the estimator.

According to another aspect of an embodiment, there is disclosed a DF system comprising an antenna system that senses EM waves, a receiving system, and an estimator system, wherein the antenna system may include at least one multi-port antenna comprising at least two conductive pieces and a plurality of ports connected across the at least two conductive pieces, each of the ports being configured to simultaneously sense multiple EM field components, including (1) E-field components (a) that induce a charge between the two or more conductive pieces relative to each other, or (b) that induce a charge across a metal piece having multiple ports that sense the charge, and (2) H-field components which induce currents to flow through conductive loops (a) that include the ports and at least two conductive pieces arranged to sense the E-field induced charges, such that the ports simultaneously sense H-field induced currents, and (b) that different H-field components flow through and, and the antenna system outputs signals from its plurality of ports, wherein the receiving system accepts the signals from the plurality of ports in the antenna system, and outputs a group of signals of interest, each signal of interest having a set of outputs corresponding to respectively the antenna system's plurality of ports, to the estimator system, wherein one or both of the receiving system and the estimator system may be configured to pass signals of interest and reject other signals, wherein the estimator system accepts the set of signals output by the receiving system, has access to an array manifold matching the antenna system and that covers the signals of interest it accepts, and (1) generates an estimated AoA and some or all of polarization, magnitude, and SNR for each signal of interest and the AoA, polarization, magnitude, and SNR of multipath terms associated with each signal of interest, by finding, for each signal of interest, a combination of angles, magnitudes, and polarizations in the array manifold that generates a set of port voltages most closely matching, according to a matching metric, those from the signal of interest, and (2) an estimated range based on one or both of (a) how the estimated magnitude of the signal of interest changed over time, and (b) how the estimated AoA of the signal of interest changed over time, when the DF system and RF emitter move relative to each other over time.

The array manifold may comprise a memory storing a set of data and a processor carrying out a method of manipulating the set of data such that, given a particular frequency, polarization, and AoA comprised of an azimuth and elevation angle, the estimator system provides a complex output voltage for each port in the antenna system, given an EM wave arriving with that combination of frequency, polarization and AoA, and wherein the DF system output communicates the AoA, polarization, and magnitude of the signal of interest and associated multipath terms, and potentially ranges between the antenna system and the RF emitters, as generated by the estimator.

According to another aspect of an embodiment, there is disclosed a DF system comprising an antenna system that senses EM waves, the antenna system including a set of ports, a receiving system, and an estimator system, wherein the antenna system may include at least one multi-port antenna comprising at least two conductive pieces and a plurality of N ports connected across the at least two conductive pieces, N being a positive integer, each of the N ports being configured to simultaneously sense multiple EM field components, including (1) E-field components (a) that induce a charge between the two or more conductive pieces relative to each other, or (b) that induce a charge across a metal piece having multiple ports that sense the charge, and (2) H-field components which induce currents to flow through conductive loops (a) that include the ports and at least two conductive pieces arranged to sense the E-field induced charges, such that the ports simultaneously sense H-field induced currents, and (b) that different H-field components flow through and, and the antenna system outputs signals from its plurality of ports, wherein the receiving system accepts the signals from the plurality of ports in the antenna system, and outputs a group of signals of interest, each signal of interest having a set of outputs corresponding to respectively the antenna system's plurality of ports, to the estimator system, wherein the at least two conductive pieces attach across the N ports, wherein the N ports sense any charge between the pair of conductive surfaces and any charge across a conductive piece between the attachment points of the N ports, the charge being induced by E-field components of the EM wave, wherein the volume of space enclosed by current loops through N ports is shared with the volume of space holding an electric charge between the pair of conductive pieces attached to the N ports, wherein the same N ports that sense an E-field induced charge also sense a current flowing through the current loops, the currents being induced by H-field components flowing through the loops, wherein the receiving system accepts the signals from the antenna system's N ports, and outputs a group of signals of interest, each signal of interest having of a set of outputs corresponding to the antenna system's N ports, to the estimator system, wherein one or both of the receiving system and the estimator system are configured to pass signals of interest and reject other signals, wherein the estimator system accepts the signals output by the receiving system, has access to or includes an array manifold matching the antenna system and that covers the signals of interest the estimator system accepts, and generates an estimated AoA by finding, for each signal of interest, an angle in the array manifold that has port voltages most closely matching, according to a matching metric, those from a signal of interest. The estimator system may be further adapted to determine an estimated range based on how the magnitude of the signal of interest changes over time, or how the estimated AoA changes over time, or both, when the DF system and RF emitter move relative to each other over time. The array manifold may comprise a memory storing a set of data and a method and, given a particular angle comprised of an azimuth and elevation angle, provides a complex output voltage at each of the N ports, given an EM wave arriving at that angle, and wherein the DF system output communicates the angles between the antenna system and the RF emitters, generated by the estimator.

Further features and advantages of the present invention, as well as the structure and operation of various embodiments of the present invention, are described in detail below with reference to the accompanying drawings. It is noted that the present invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the methods and systems of embodiments of the invention by way of example, and not by way of limitation. Together with the detailed description, the drawings further serve to explain the principles of and to enable a person skilled in the relevant art(s) to make and use the methods and systems presented herein. In the drawings, like reference numbers indicate identical or functionally similar elements.

DETAILED DESCRIPTION

Figure 1A:
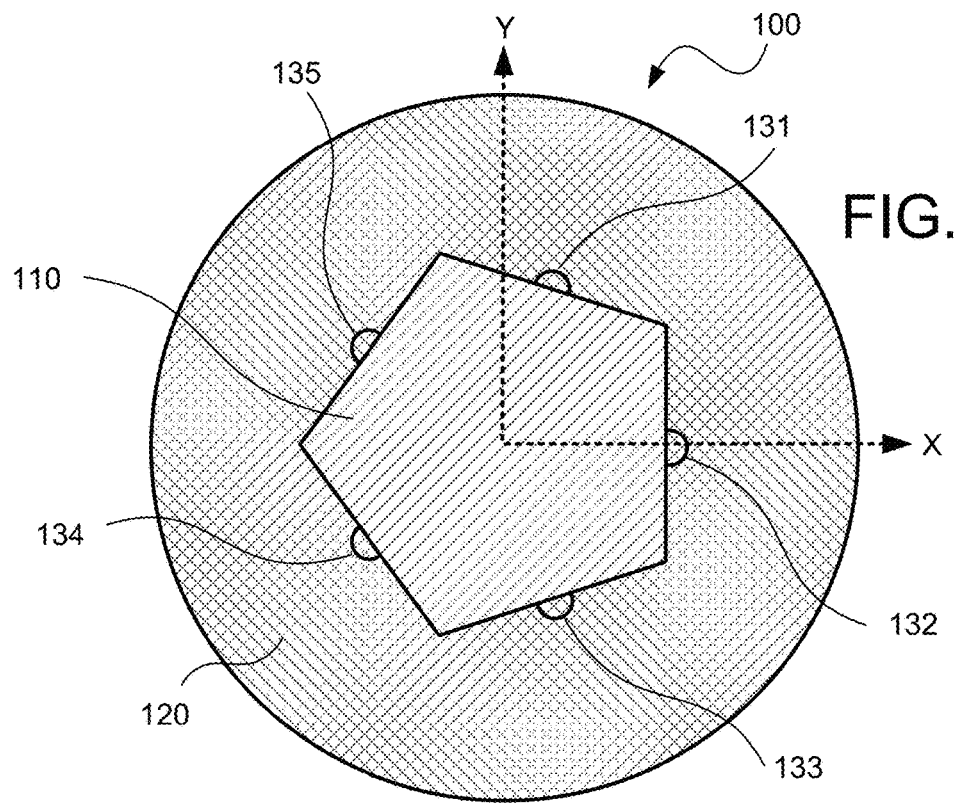
FIG. 1A and FIG. 1B are a plan and perspective view, respectively, of an embodiment of a multiport antenna according to an aspect of a disclosed embodiment.

This specification discloses one or more embodiments that incorporate the features of this invention. The disclosed embodiment(s) merely exemplify the present invention. The scope of the present invention is not limited to the disclosed embodiment(s). The present invention is defined by the claims appended hereto.

The embodiment(s) described, and references in the specification to "one embodiment," "an embodiment," "an example embodiment," "an exemplary embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

The disclosed subject matter relates to multi-port antennas and DF systems. A three or more port multiport antenna is comprised of two or more conductive pieces with three or more ports physically distributed around the two or more conductive pieces, each port having two terminals, a first terminal and a second terminal, wherein each port's first terminal is connected to one conductive piece, and each port's second terminal is connected to a different conductive piece, and at least three of the ports form current loops through each other via their connection to the two or more conductive pieces.

The construction has the property that the H-field sensing current loops have current flowing through the same shared conductive pieces and across the terminals of the same set of physically distributed ports, that are sensing E-fields, which are inducing different charges across those same ports. That all the ports contain both an E and H field component allow the ports to have well-defined patterns that are useful for direction finding at extremely low frequencies where the antenna is extremely electrically small.

The construction also allows all ports to be physically constructed in a coaxial configuration where the shields of the coaxial ports all connect to a common metal piece, allowing every port to have a direct wide-band connection without any band limiting, or reliability limiting, or weight adding component such as a balun. Moreover, the coaxial port configuration allows the antenna to be easily configurable since a port can attach to a coaxial switch that can be configured to select between different terminations, such as a short, open, or a specific impedance, or select between bypassing or using an amplifier, or select between different filters in a filter bank. It also allows extremely low system noise figures at high frequencies because a low noise amplifier can be connected to the coaxial port, effectively, with no lossy cable.

Figure 1B:
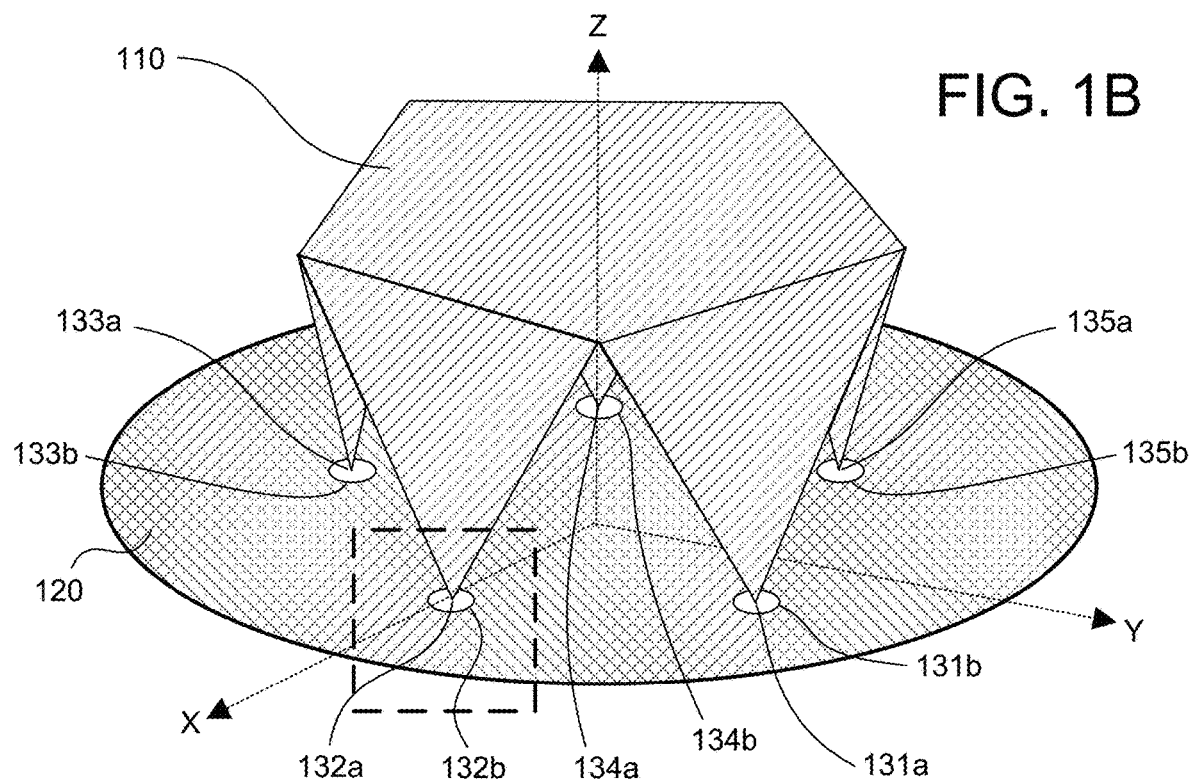

FIGS. 1A and 1B illustrate, using a top and perspective view, respectively, an embodiment of a multiport antenna 100 with two conductive pieces and five ports, each port having a first and a second terminal, where the first terminal of all five ports connects to a first conductive piece, and where the second terminal of all five ports connects to a second conductive piece, and where the ports are physically distributed.

Figure 1C:
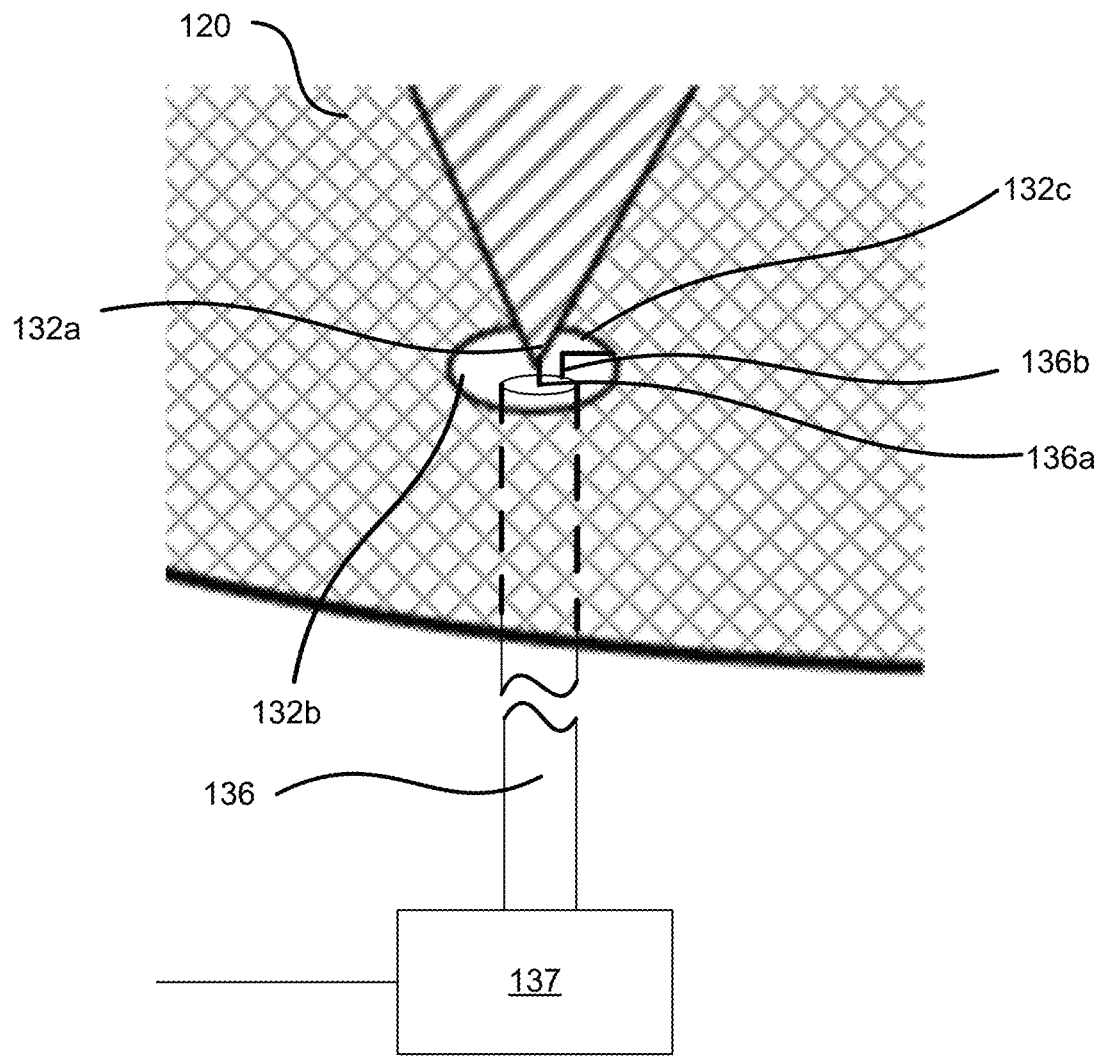
FIG. 1C is a partially schematic, not-to-scale view of an aspect of the embodiment of FIG. 1A and FIG. 1B.

More specifically, FIGS. 1A and 1B illustrate an embodiment of a multiport antenna 100 with two conductive pieces, a first conductive piece 110 and a second conductive piece 120, and five ports 131, 132, 133, 134, and 135. Each port has a first and a second terminal. The perspective view shown in FIG. 1B labels the first terminal of each of the ports with the letter "a", as in terminal 131a, 132a, 133a, 134a, and 135a, which all are electrically connected to first conductive piece 110. The second terminal of each of the ports, terminals 131b, 132b, 133b, 134b, and 135b, is electrically connected to the second conductive piece 120. As such, the first terminal of all five ports connects to the first conductive piece 110, the second terminal of all five ports connects to the second conductive piece 120, and the ports are physically distributed. The illustrated arrangement allows a coaxial cable or other type of coaxial connector or terminator 136 to be used to connect to a port as shown in FIG. 1C, which is a magnified version of the contents of the broken box in FIG. 1B, using port 132 as an example. In this case, the coaxial center conductor 136a connects to the "a" side or first terminal of a port and connects to first conductive piece 110, and the shield 136b of the coaxial cable or connector 136 connects to the "b" side or second terminal of a port and to the second conductive piece 120, or vice versa. The coaxial cable 136 could be routed along either side of second conductive piece 120. As shown in FIG. 1C, an embodiment can be provided with structure defining a hole 132c in the second conductive piece 120 for each port using port 132 as an example to allow the coaxial cable 136 to be routed on the side of second conductive piece 120 opposite to first conductive piece 110, which allows a coaxial connector to be placed on the side of the second conductive piece 120 opposite to the first conductive piece 110.

The ports themselves are coaxial in the sense that they include a center conductor, for example, the tip of the triangular piece, and a surrounding structure, for example, the hole. The coaxial port configuration as just described allows every port to have a direct wide-band connection without any band limiting, or reliability limiting, or weight adding component such as a balun. Moreover, it allows the antenna to made easily configurable since a port can attach to a coaxial switch 137 that can be configured to select between different terminations, such as a short, open, or a specific impedance, or select between bypassing or using an amplifier, or select between different filters in a filter bank. The coaxial port configuration also allows extremely low system noise temperatures since a low noise amplifier can be connected to the coaxial port, effectively, with no lossy cable. The coaxial port configuration also allows the shields of the coaxial cables from all ports to be bonded to second conductive piece 120 and routed such that the cables from all the ports exit the second conductive piece 120 together at a specified location, with all their shields attached to each other. This routing configuration can be preferred in applications where there is a desire for multiple manufactured antennas to have identical manifolds, eliminating the time and cost associated with making the measurements and doing the calculations required to create a manifold, and associated with tracking antenna serial numbers with their manifold. Of course, it will be apparent to one having ordinary skill in the art that other arrangements may be used.

Also as show in in FIGS. 1A and 1B, in some embodiments the antenna 100 may have an overall box-like shape with one of the conductive pieces being substantially planar and the other conductive piece having a substantially planar portion spaced away from and substantially parallel to the substantially planar conductive piece. Here 'substantially planar" and "substantially parallel" 'means sufficiently close to planar or parallel that electrical performance is not unduly affected.

Figure 2A:
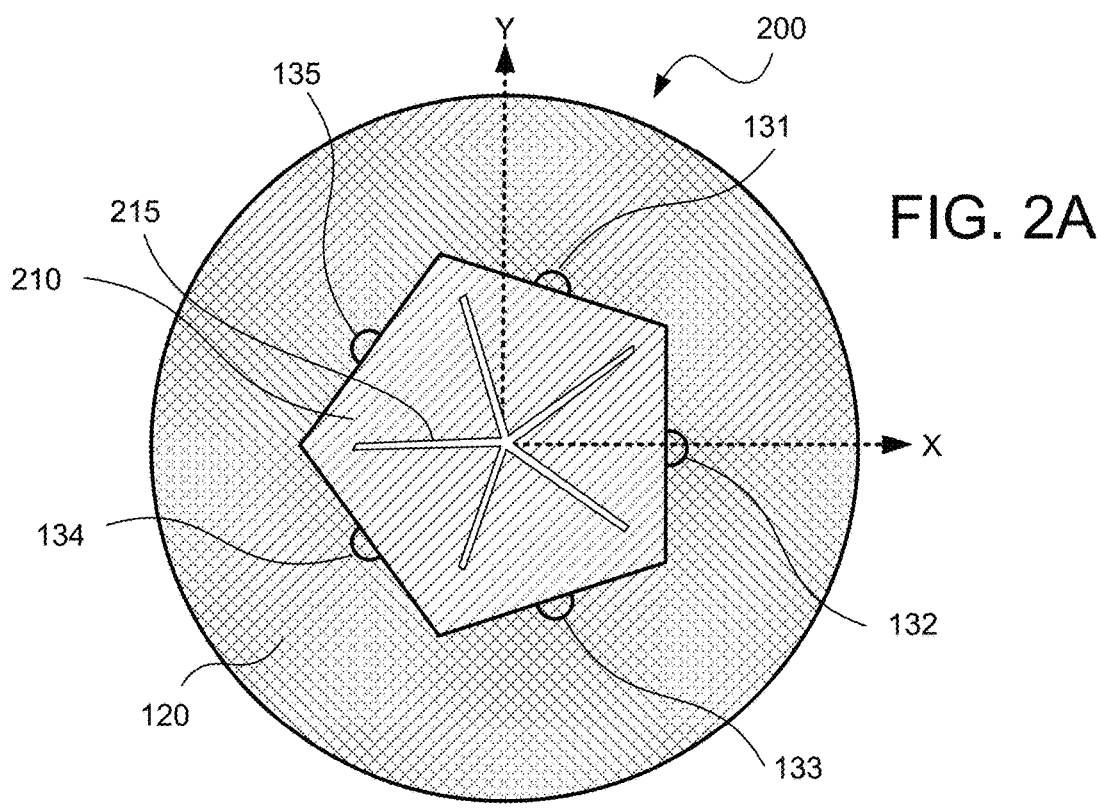
FIG. 2A and FIG. 2B are a plan and perspective view, respectively, of another embodiment of a multiport antenna according to an aspect of a disclosed embodiment.
Figure 2B:
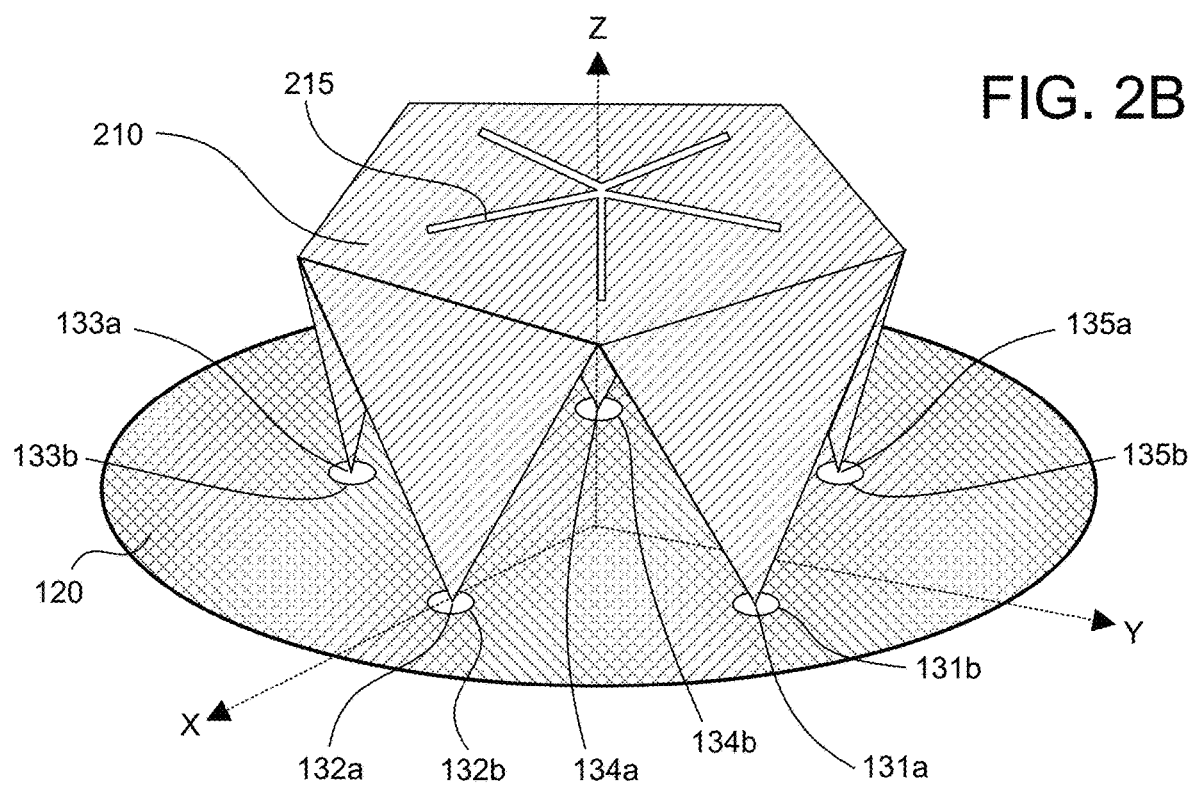

FIG. 2A is a plan view and FIG. 2B is a perspective view of an embodiment of a multiport antenna 200 which is the same as that shown in FIG. 1 but with slits in the first conductive piece 210 to illustrate provision for modifying the current flow in a conductive piece.

More specifically, FIGS. 2A and 2B illustrate modification of the current flow in a conductive piece by cutting one or more apertures into the conductive piece. In this case, the first conductive piece 110 in FIG. 1 is modified to become first conductive piece 210 in FIGS. 2A and 2B, where 210 includes an aperture 215 that is cut into the first conductive piece 210. One or more aperture patterns can be cut into either or both conductive pieces 210 and 120. Similarly, the triangular sides going from the top of the first conductive piece, down to the first terminal of a port, can be shaped or cut with a pattern. For example, the pattern could be cut or shaped as a zig-zag or sinuous shape to affect the antenna's characteristics at higher frequencies, or in certain frequency bands, while leaving its performance at low frequencies unchanged.

Figure 3A:
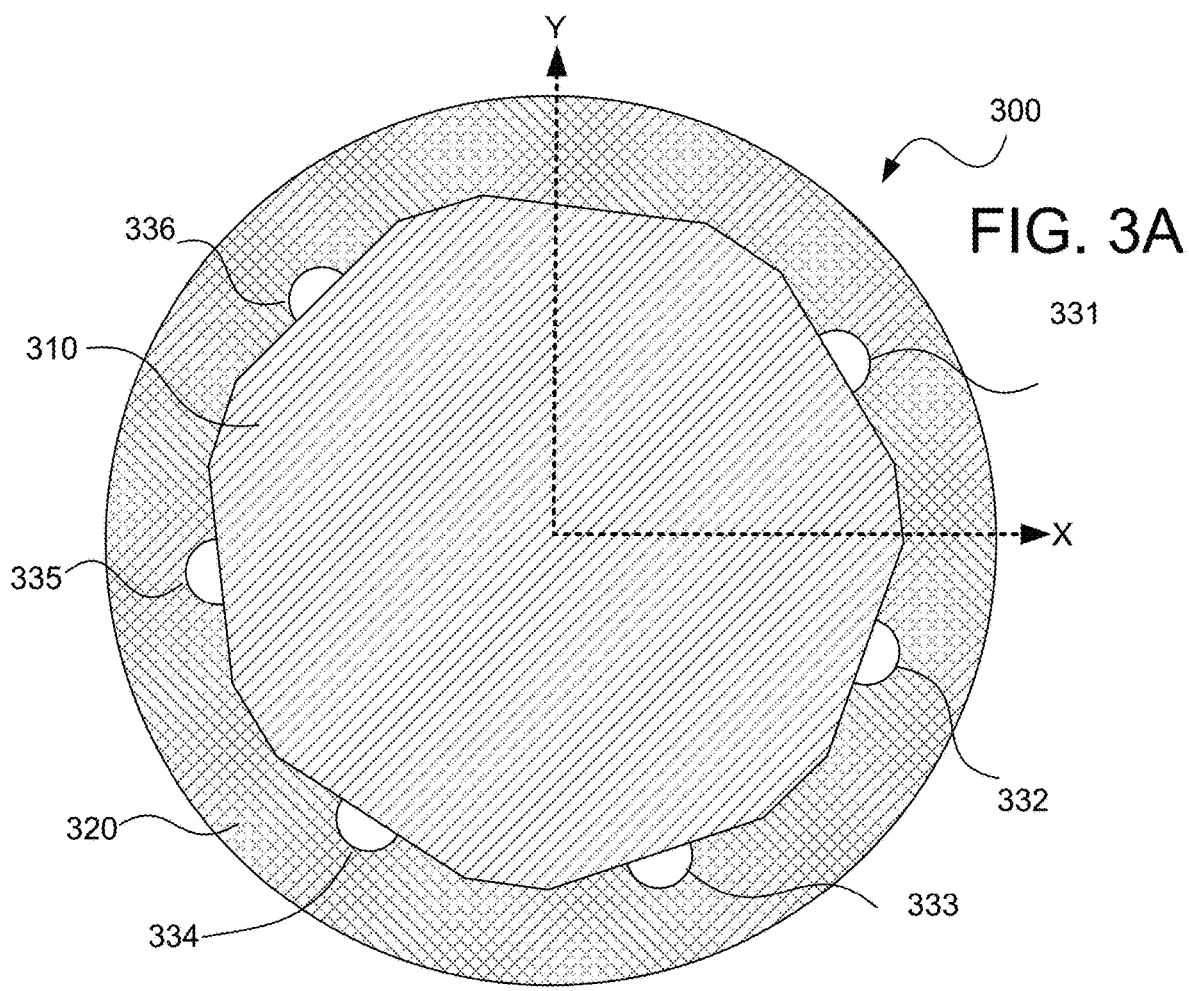
FIG. 3A and FIG. 3B are a plan and perspective view, respectively, of another embodiment of a multiport antenna according to an aspect of a disclosed embodiment.
Figure 3B:
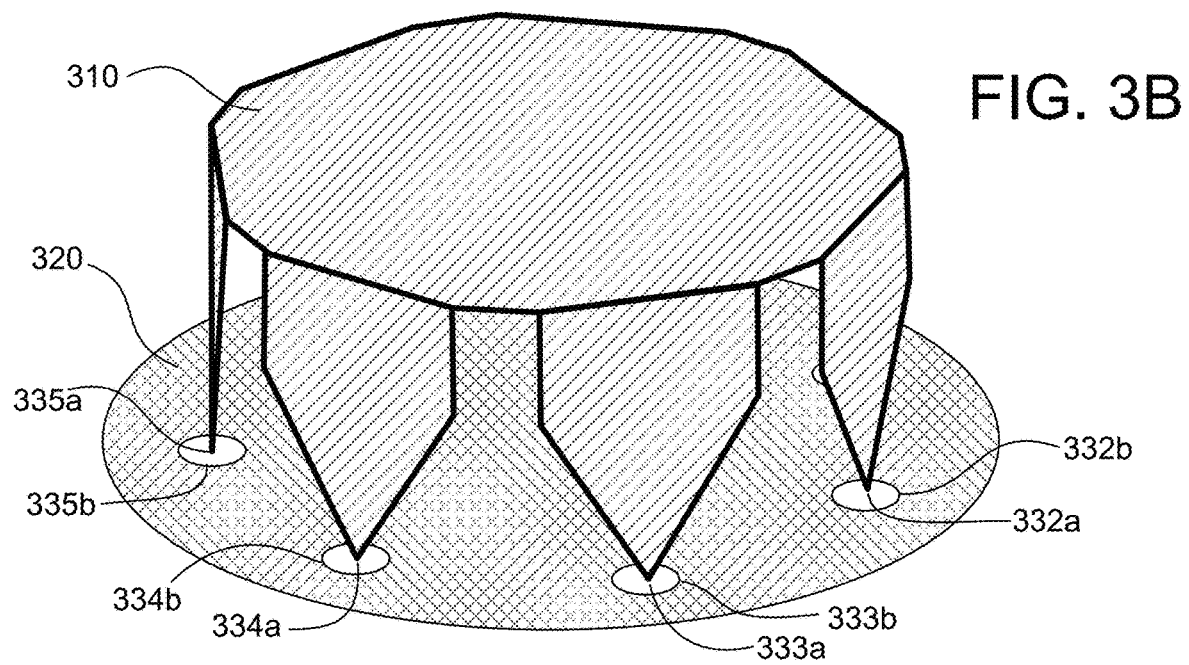

FIGS. 3A and 3B illustrate, using a top view (FIG. 3A), and perspective view (FIG. 3B), an embodiment of a multiport antenna 300 similar to that shown in FIG. 1 but with six ports instead of five, with the ports asymmetrically distributed, and with the number of ports not symmetrical or matching with the number of sides on the first conductive piece 310.

More specifically, FIGS. 3A and 3B illustrate an embodiment with two conductive pieces, a first piece 310 that is shaped as a 7 sided (heptagon), and a second piece 320 that is oval shaped, and with six ports, with the ports asymmetrically distributed, and with the number of ports not symmetrical or matching with the number of sides on the first conductive piece. FIG. 3A shows the six ports labeled as 331, 332, 333, 334, 335, and 336. Each port has a first and a second terminal. The perspective view shown in FIG. 3B labels the first terminal of each of the ports with the letter "a", as in 331a, 332a, 333a, 334a, 335a, and 336a, which all connect to conductive piece 310. The perspective view shown in FIG. 3B labels the second terminal of each of the ports with the letter "b", as in 331b, 332b, 333b, 334b, 335b, and 336b, which all connect to conductive piece 320. As such, the first terminal of all six ports connects to first conductive piece 310, the second terminal of all six ports connect to second conductive piece 320, and the ports are non-symmetrically physically distributed. As with the other embodiments described above, other constructions would be obvious to one skilled in the art, but the construction illustrated can confer certain benefits in some applications.

Figure 4A:
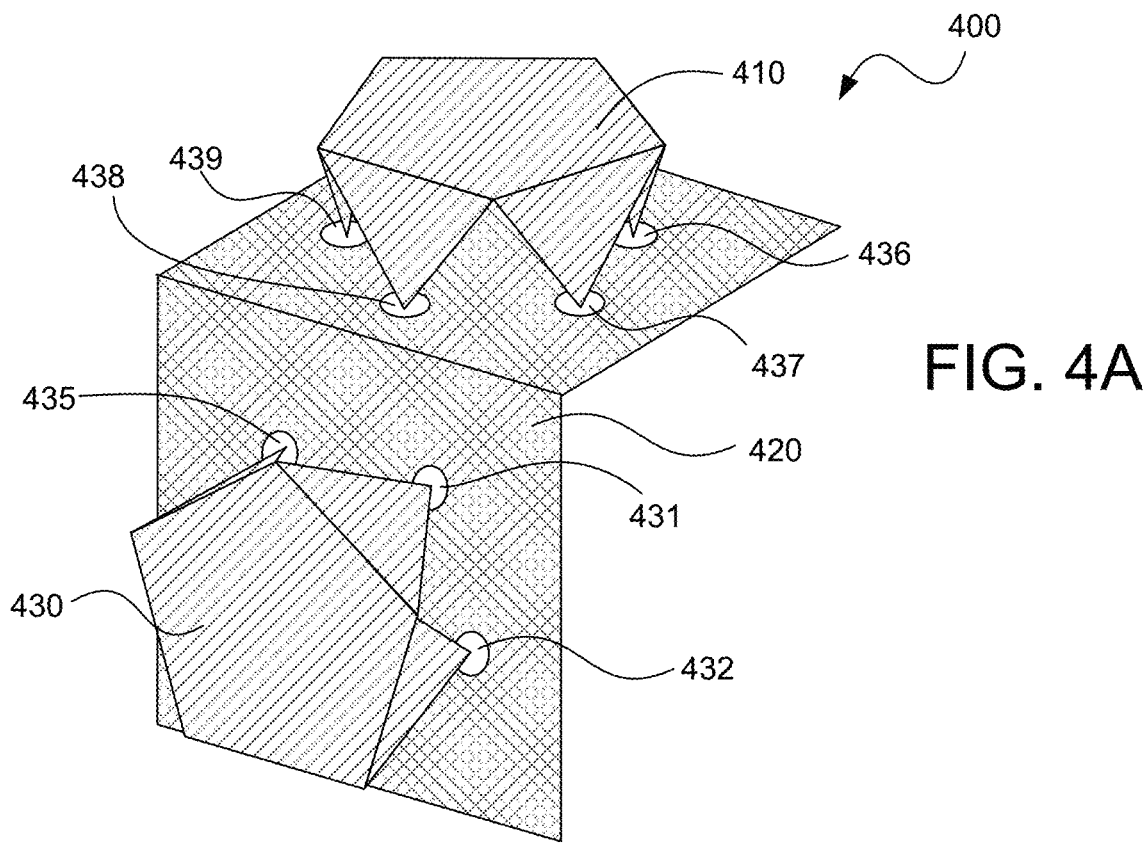
FIG. 4A and FIG. 4B are a perspective and front view, respectively, of another embodiment of a multiport antenna according to an aspect of a disclosed embodiment.
Figure 4B:
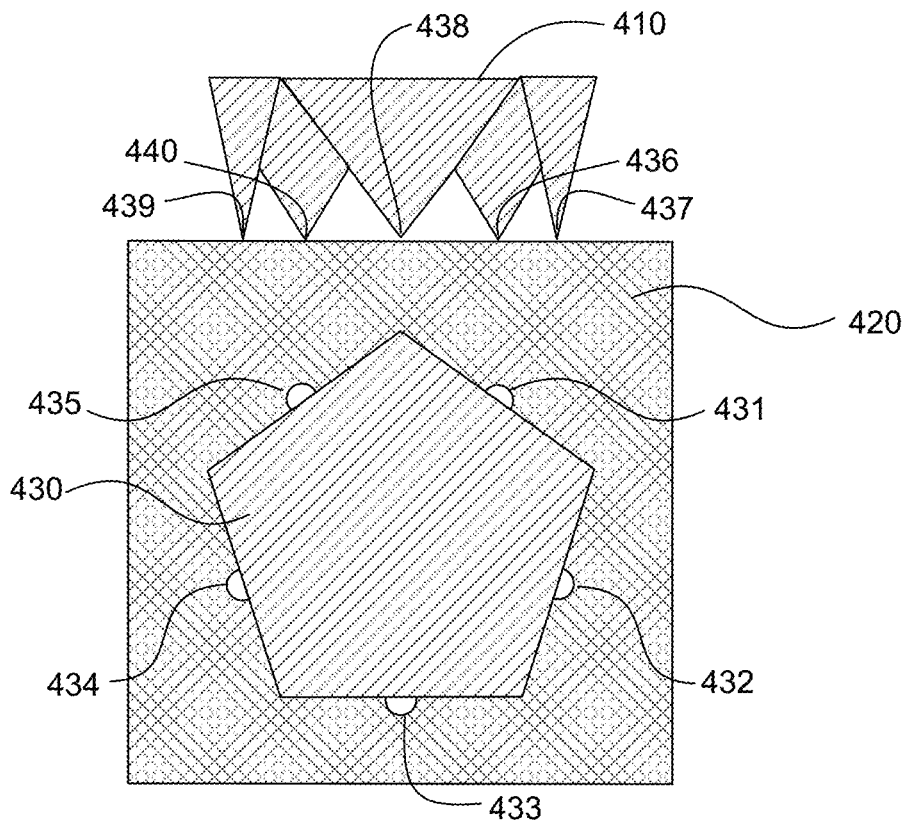

FIGS. 4A and 4B illustrate, using a perspective and front view, respectively, an embodiment of a multiport antenna 400 with three conductive pieces 410, 420, and 430 and 10 ports, ports 431, 432, 433, 434, 435, 436, 437, 438, 439, and 440 are visible in at least one of the figures, each port having a first and a second terminal, where, similarly to the port connections in the arrangement of FIG. 1, a first terminal of ports 431-435 connects to the third conductive piece 430 and a first terminal of ports 436-440 connects to the second conductive piece 410. In the arrangement of FIGS. 4A and 4B, there is a second conductive piece 420 and the second terminal of the ports connects to the second conductive piece 420. As such, the second terminal of all ten ports connect to the second conductive piece 420.

More specifically, FIGS. 4A and 4B show an embodiment with three conductive pieces, a first piece 410, a second piece 420, and a third piece 430, and ten ports, each with two terminals, a first terminal and a second terminal connected like those shown in the preceding figures. The conductive pieces can be in an asymmetrical arrangement and the ports can be asymmetrically physically distributed. Five of the ports, ports 431, 432, 433, 434, 435 have their first terminal connected to conductive piece 430. The other five ports, ports 436, 437, 438, 439, 440, have their first terminal connected to the first conductive piece 410. The ports could be distributed differently such that more are connected to the first conductive piece 410 or vice-versa. Regardless of distribution, all ten ports have their second terminal connected to second conductive piece 420. As such, the coaxial cable connections and routing described in the text around FIG. 1C and its advantages remains applicable and allows every port to have a direct wide-band connection without any band limiting, or reliability limiting, or weight adding component such as a balun.

Figure 5:
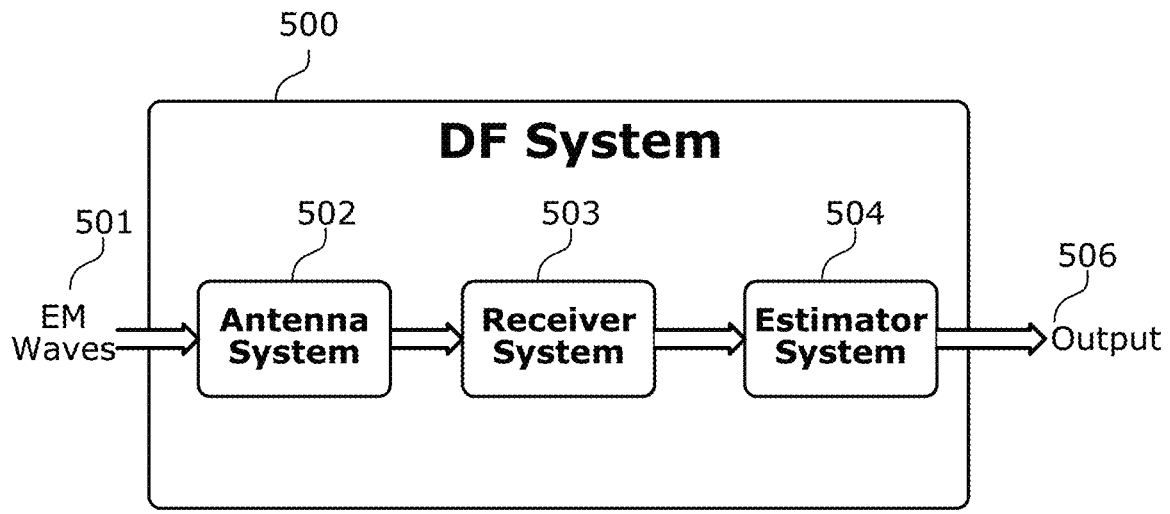
FIG. 5 is a functional block diagram for an embodiment of a DF system, containing an antenna system, a receiver system, and an estimator system according to an aspect of an embodiment.

FIG. 5 shows the signal flow through a DF system 500 according to an aspect of an embodiment. Electromagnetic (EM) waves 501 from various emitters arrive and are received by an antenna system 502. Antenna system 502 has characteristics captured in an array manifold and consistently with this manifold, converts the incoming EM wave 501 into a set of complex voltages, the set corresponding to the outputs of the ports in an antenna system 502. A receiver system 503 has a set of receive channels allowing it to accept the set of port voltages. The set of receive channels isolates and digitizes signals of potential interest (SoPI) and outputs a corresponding set of digitized SoPI. The set of digitized SoPI is accepted by an estimator system 504. The estimator system 504 has access to an array manifold characterizing antenna system 502, for example by virtue of the array manifold being part of the estimator system 504, and may also have knowledge of a set of phase and magnitude shifts that occur in the set of paths between the set of ports in antenna system 502 and the set of channels in receiver system 503, and uses this knowledge, along with the set of digitized SoPI, to estimate the AoA, and potentially other signal parameters, which estimate(s) it passes to output 506.

Figure 6:
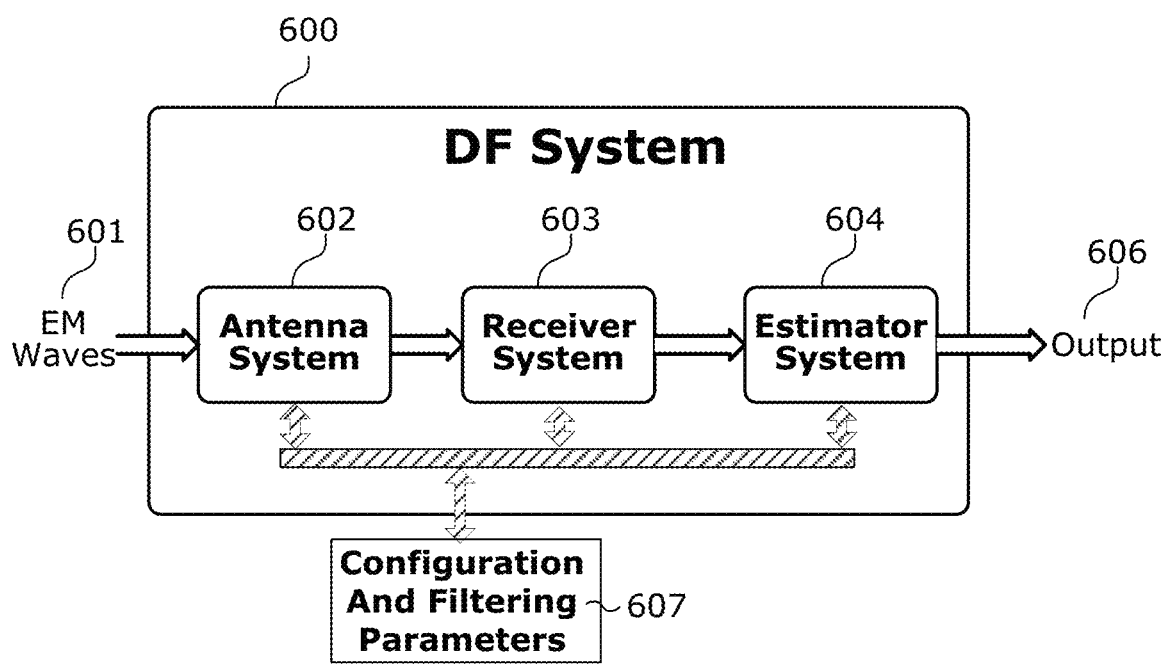
FIG. 6 is a functional block diagram for an embodiment of a DF system, containing an antenna system, a receiver system, and an estimator system according to another aspect of an embodiment.

FIG. 6 is a functional block diagram for an embodiment of the DF system similar to that shown in FIG. 5, but in which provision is made for each block to accept or communicate parameters. The blocks can communicate configuration and filtering parameters between themselves, or from an attached system, or both, allowing quick and easy customization, adaptability, and regression testing.

FIG. 6 shows the signal flow through DF system 600. Electromagnetic (EM) waves 601 from various emitters arrive and are received by an antenna system 602. The antenna system 602 has characteristics captured in an array manifold and consistently with this manifold, converts the incoming EM wave 601 into a set of complex voltages, the set corresponding to the outputs of the ports in the antenna system 602. A receiver system 603 has a set of receive channels allowing it to accept the set of port voltages. The set of receive channels isolates and digitizes signals of potential interest (SoPI) and outputs a corresponding set of digitized SoPI. The set of digitized SoPI are accepted by an estimator system 604. The estimator system 604 has knowledge of the manifold characterizing the antenna system 602, and may also have knowledge of a set of phase and magnitude shifts that occur in the set of paths between the set of ports in the antenna system 602 and the set of channels in the receiver system 603, and uses this knowledge, along with the set of digitized SoPI, to estimate the AoA, and potentially other signal parameters, which estimate(s) it passes to output 606. Configuration and filtering parameters 607 can be used by at least one of: the antenna system 602, receiver system 603, and estimator system 604. The configuration and filtering parameters 607 may be communicated between 602, 603, and 604, or from an attached system, or both, allowing quick and easy customization, adaptability, and regression testing.

As described in the text describing FIGS. 1A-1C, a coaxial port configuration facilitates antenna system 602 being made configurable because a port can attach to a coaxial switch that can be configured to select between different terminations, such as a short, open, specific impedance, or specific length of transmission line, or select between bypassing or using an amplifier, or select between different filters in a filter bank. Each configuration would require an associated array manifold. Via configuration and filtering parameters 607, antenna system 602 can be configured, and estimator system 604 can be given the array manifold associated with that antenna system 602 configuration. Similarly, since the array manifold is affected by the port terminations, and receiver system 603 may have configurations that present different termination impedances to the antenna, configuration and filtering parameters 607 can be used to communicate a manifold to estimator system 604 that is associated with the configuration and filtering parameters 607 accepted by receiver system 603. Communication of the manifold via configuration and filtering parameters 607 allows the same DF system hardware to be easily and quickly used in different installations. In this case, the estimator system 604 would accept as part of the configuration and filtering parameters 607, an "as installed" array manifold for that particular installation.

Figure 7:
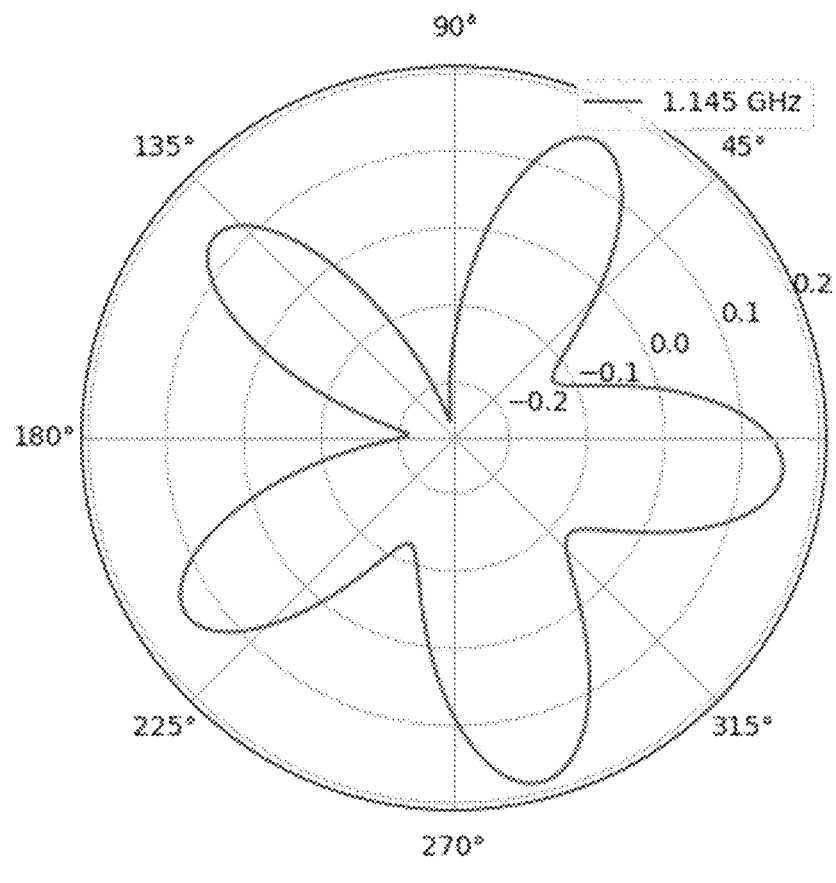
FIG. 7 is a dB polar, highly magnified plot of the total energy captured by all the ports (i.e. the sum) versus azimuth, for a multiport antenna such as that illustrated in FIG. 1.

FIG. 7 is a dB polar highly magnified plot of the total energy captured by all the ports (i.e. the sum) versus azimuth, for a multiport antenna such as that illustrated in FIG. 1. It shows an almost perfectly uniform omnidirectional energy capture pattern, with only +/−0.2 dB of variation versus azimuth angle, which is ideal for direction finding. Most arrays have far more variation, and as a result, perform poorly at some angles.

Figure 8:
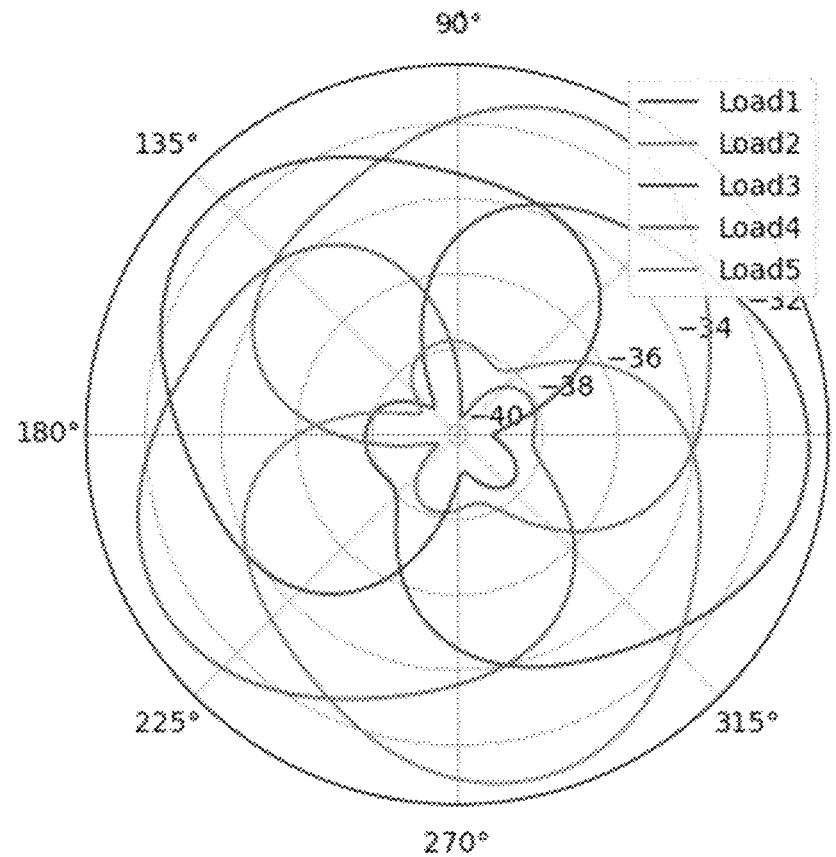
FIG. 8 is a dB polar plot showing in a separate trace the pattern produced by each of the ports versus azimuth, for a multiport antenna such as that illustrated in FIG. 1.

FIG. 8 is a dB polar plot showing in a separate trace the pattern produced by each of the ports versus azimuth, for a multiport antenna such as that illustrated in FIG. 1. It shows a set of patterns where each port has a pattern that is different from the patterns for the other ports, nominally all rotated copies of one another, where a null or low point from one port, is covered by a lobe or high point from another port. As such, the phase and powers coming out of the set of ports relative to each other can be associated with the AoA of the signal generating that set of complex port voltages. Such a set of patterns is ideal for DF and many DF processing methods.

Figure 9:
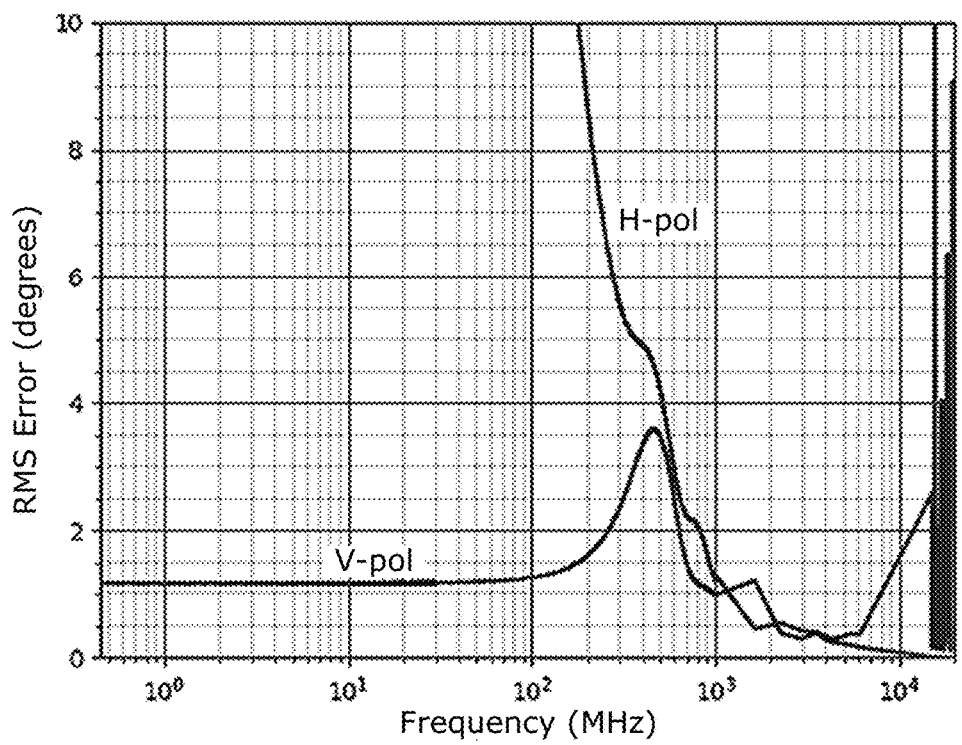
FIG. 9 is a plot showing the RMS AoA error versus frequency, for a typical signal being listened to with 10 dB SNR, for the described DF system using a multiport antenna such as that shown in FIG. 1.

FIG. 9 is a plot showing the RMS AoA error versus frequency, for a typical signal being listened to with 10 dB SNR, for the described DF system using a multiport antenna such as that shown in FIG. 1 and the described DF processing. In vertical polarization it shows typically less than 2 degrees RMS AoA error across an extraordinary frequency range of 500 kHz to 10 GHz. In horizontal polarization it shows typically less than 2 degrees RMS AoA error across the extraordinary frequency range of 800 MHz to 10 GHz.

Figure 10:
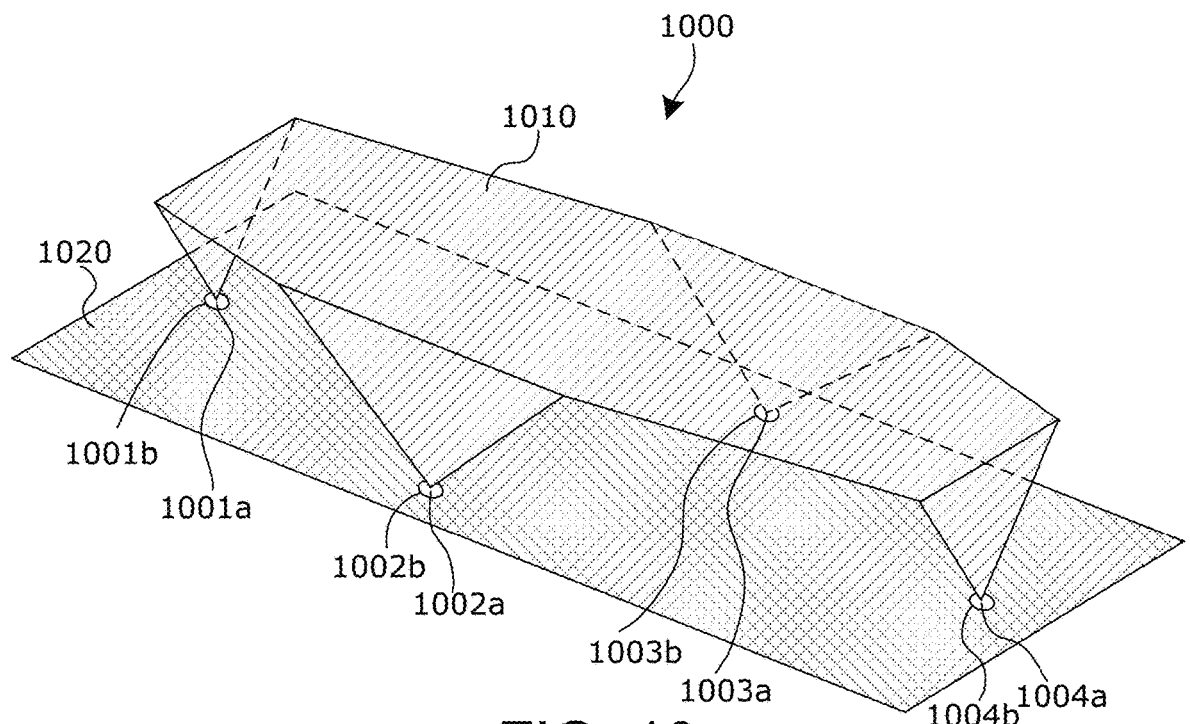
FIG. 10 is a perspective view of an embodiment of a multiport antenna according to an aspect of an embodiment.

FIG. 10 is a perspective view of an embodiment of a multiport antenna with two conductive pieces and four ports, each port having a first and a second terminal, where the first terminal of all four ports connects to a first conductive piece, and where the second terminal of all four ports connects to a second conductive piece, and where the ports are physically distributed unequally around a conductive piece with an octagon shaped top with triangular sections bent down to create port locations at the bottom tips of the triangles.

More specifically, FIG. 10 illustrates an embodiment of a multiport antenna 1000 with two conductive pieces, a first conductive piece 1010, and a second conductive piece 1020, plus four ports, where each port has two terminals, a first terminal and a second terminal. Following the labeling in FIGS. 1A-1C, the first terminal of each of the ports is identified with the letter "a", as in 1001a, 1002a, 1003a, and 1004a, which all connect to the first conductive piece 1010. Similarly, the second terminal of each of the ports is identified with the letter "b", as in 1001b, 1002b, 1003b, and 1004b, which all connect to the second conductive piece 1020. As such, the first terminals of all four ports are connected to first conductive piece 1010, and the second terminals of all four ports are connected to second conductive piece 1020. FIG. 10 shows more clearly how the ports can be distributed non-symmetrically around a non-symmetrically shaped conductive piece. In this case, both conductive pieces are conformally shaped to fit into another housing. The same comments and benefits regarding the coaxial port connections, and the coaxial cable routing along either side of 1020, apply to this FIG. 10 construction.

Figure 11:
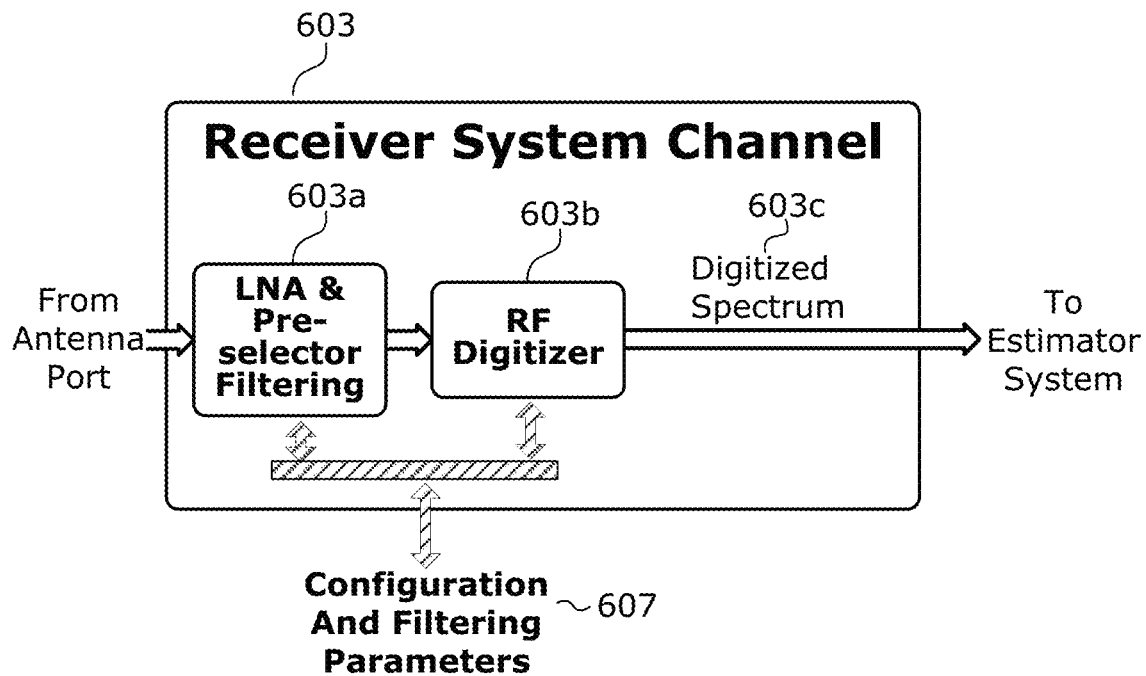
FIG. 11 is a functional block diagram illustrating an example arrangement for one of the channels in the multi-channel receiver system of FIG. 6 according to an aspect of an embodiment.

FIG. 11 shows a possible implementation of one of the receiver system channels in the multi-channel receiver system 603 shown in FIG. 6, being comprised of a low noise amplifier (LNA) and preselector filter 603a and an RF digitizer 603b. The LNA and preselector filter 603a allows weak signals of potential interest (SoPI) at frequencies of interest to be isolated and captured by RF digitizer 603b. RF digitizer 603b includes a digitizer (i.e. analog-to-digital converter), generally with a sampling clock that is tied to an absolute time, and mechanism that time stamps digitized records with an absolute time such as a GPS based time, and can include a frequency translation and filtering circuit at its input such as a tunable superheterodyne receiver prior to its digitizer, or a digital frequency filtering and translation process after its digitizer, such as a digital down converter, or both or neither. The configuration and filtering parameters 607 can include controls for LNA & preselector filter 603a, such as tuning or selecting the frequency passbands and stopbands, and controlling the gain, including bypassing amplifiers to enhance the system's dynamic range for different RF environments. The parameters 607 can also include controls for RF Digitizer 603b, such as the frequency translation prior to the digitizer, the digitizer sampling rate, and the frequency translation after the digitizer and any filtering and decimation applied to the output of the digitizer in order to further isolate SoPI from other signals in the output digitized spectrum 603c. The output of 603 is a set of digitized spectrums corresponding to the set of port voltages from the antenna ports.

Figure 12:
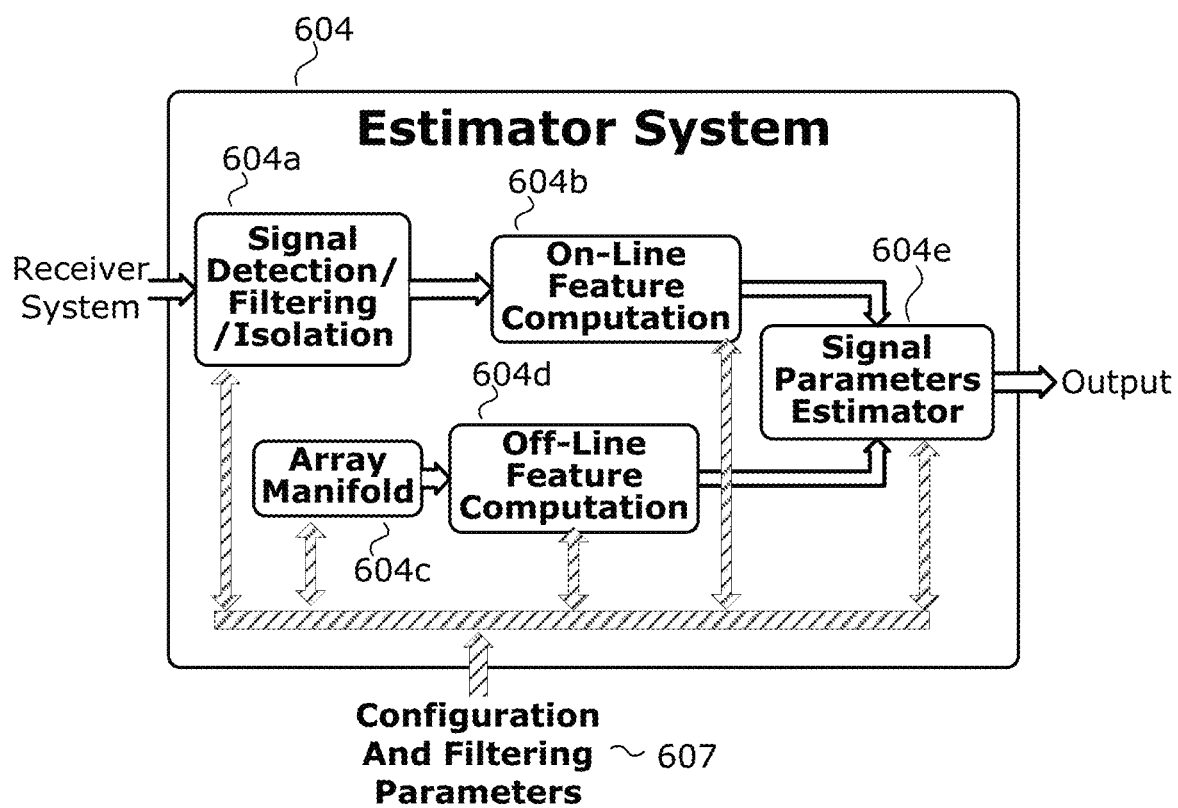
FIG. 12 is a functional block diagram for a possible implementation of the estimator system of FIG. 6 according to an aspect of an embodiment.

FIG. 12 shows a possible implementation of one of the estimator system channels in the estimator system 604 shown in FIG. 6. The set of signals coming from the receiver system 603 are accepted by Signal Detection/Filtering/Isolation block 604a, which can be pre-programmed with default pre-estimation SoI defining parameters or can receive pre-estimation SoI defining parameters from the configuration and filtering parameters 607. Pre-estimation SoI defining parameters distinguish an SoPI from other extraneous signals and noise. Pre-estimation SoI defining parameters can include a set of frequency-hop parameters, such as the hop frequency spacing, hop rate, highest and lowest frequency, on and off durations, etc. Pre-estimation SoI defining parameters can also include ranges for an SoI's frequency, average magnitude, standard deviation of its magnitude over a parameterized time period, peak magnitude, bandwidth, modulation type (which can include if it is pulsed, packetized, continuous AM, FM, nPSK, QAM, hopped, etc.) and parameters associated with the detected modulation type, such as the time duration of its pulse, or its packets, or a duty cycle, a repetition rate, hop parameters, etc. Pre-estimation SoI defining parameters could also include rejection criteria, such as parameters for a priori known interfering signals and noise sources that should be ignored.

In one embodiment, Signal Detection/Filtering/Isolation block 604a is configured to perform a joint-time-frequency-analysis (JTFA), typically comprised of a series of overlapping discrete Fourier transforms (DFT) and perform constant false alarm rate (CFAR) detection of signals matching the time durations and frequency ranges specified in the pre-estimation SoI defining parameters it receives from the configuration and filtering parameters 607. For signals passing the pre-estimation SoI defining parameters tests, 604a outputs either (A) a set of filtered signal bursts covering the SoI's detected time duration or a parameter specified time duration carried by the configuration and filtering parameters 607, each SoI output as a data record with $N_s$ time samples where each SoI can have a different $N_s$, or (B) a set of filtered signal bursts covering the SoI's detected bandwidth or a parameter specified bandwidth carried by the configuration and filtering parameters 607, each SoI output as a data record with $N_s$ frequency samples, where each SoI can have a different $N_s$, where, for each SoI, the frequency domain output record in B is related to the time domain output record in A by a Fourier Transform. In either frequency or time domain cases, the $N_p$ row matrix coming out of Signal Detection/Filtering/Isolation block 604a is associated with an SoPI having $N_s$ samples, forming an $N_p \times N_s$ matrix.

That set of filtered signal bursts, which correspond to the set of port voltages, is accepted by On-Line Feature Computation block 604b, which computes a feature vector for each SoPI burst that is output by Signal Detection/Filtering/Isolation block 604a, and passes the computed feature vector to Signal Parameter Estimator block 604e. The feature vector computation: (1) characterizes a received SoPI, which can contain a single wavefront or have multipath terms arriving from different angles of arrival, (2) is a fully phase coherent process that achieves high processing gain, (3) is agnostic to the phase of the incoming signal and only considers the differences in phase between the ports, and (4) reduces a record with many ($N_s$) samples down to a feature vector with a small number of real numbers. When there is a reference signal from a reference antenna that is independent of the DF array, the feature vector has only $2N_p$ real numbers. When there is no reference signal, the feature vector has only $N_p^2$ real numbers (separating the real and imaginary terms in the upper triangular piece of the $N_p \times N_p$ matrix which has real numbers on its diagonal). The feature vector creation process either cross-correlates every port's output voltage with every other port's output voltage, or cross-correlates every port's output voltage with a reference signal. The cross-correlation is done over a relatively large number of sample points (e.g. many narrow time samples over a long time period or many narrow band frequency-domain samples over a wide bandwidth), resulting in high processing gain. For an SSB signal with 3 kHz of bandwidth, for example, voice syllables or energy bursts last, on average, about 0.5 seconds. A 0.5 second SoPI output record would have around 5000 data points to capture the 3 kHz bandwidth SoPI. The feature computation blocks 604b and 604d translate or compress the 3 kHz bandwidth many data points on their input, to an effective processed bandwidth of 2 Hz and a low number of points on their output. For example, a 6-port DF array with no reference antenna would generate a feature vector with 36 real numbers. A 6-port DF array with a reference antenna used to eliminate estimator bias would generate a feature with 12 real numbers. The ratio of 2 Hz to 3 kHz ratio shows that for this example, the feature calculation process delivers about 32 dB of processing gain. So, a weak signal with 7 dB of SNR which is marginally intelligible, will have a post-processing 25 dB SNR for the purposes of AoA estimation. FIG. 9 is a plot of the RMS AoA error with a post-processing SNR of 25 dB, based on the antenna illustrated in FIG. 1.

Off-Line Feature Computation block 604d, using Array Manifold 604c, either has precomputed, or computes, feature vectors or matrices needed by Signal Parameter Estimator 604e, for each SoPI burst that is output by Signal Detection/Filtering/Isolation block 604a, using the known center frequency of each SoPI burst. The feature vectors or matrixes needed by Signal Parameter Estimator 604e include a feature vector or matrix for a set of angles-of-arrival (azimuth and elevation) and for two orthogonal polarizations (e.g. vertical and horizontal or right and left hand circular polarization). Each feature vector or matrix characterizes an ideal (noise free) V-pol or H-pol single wavefront (no multipath) signal at the same frequency as the SoPI burst, arriving at a particular AoA.

Signal Parameter Estimator 604e accepts the outputs from On-Line Feature Computation block 604b, and Off-Line Feature Computation block 604d, and uses a matching metric between the feature vector from 604b, and the vectors or matrixes from 604d to find a set of estimated signal parameters for each SoPI. In one embodiment, the estimated signal parameters include each SoPI's AoA, polarization parameters, magnitude, and if there are any associated multipath waves, how many there are, and their AoA, magnitude, phase, and polarization parameters. The polarization parameters are generally output as a Jones vector but may also be output a Stokes vector. Available for output are both the estimated signal parameters and the measured metrics allowing the signal to pass the pre-estimation SoI defining parameters tests. Also available are the time stamps applied to the SoPI bursts that generated the estimated signal parameters. Post-estimation SoI defining parameters include ranges for one or more of the estimated signal parameters, such as ranges of angles of arrival to ignore or output, or polarizations to ignore or output. Either predefined/default post-estimation SoI defining parameters are used, or they are accepted from the configuration and filtering parameters 607. Only SoI meeting the post-estimation SoI defining parameters are output from 604e, and thus 604.

Figure 13:
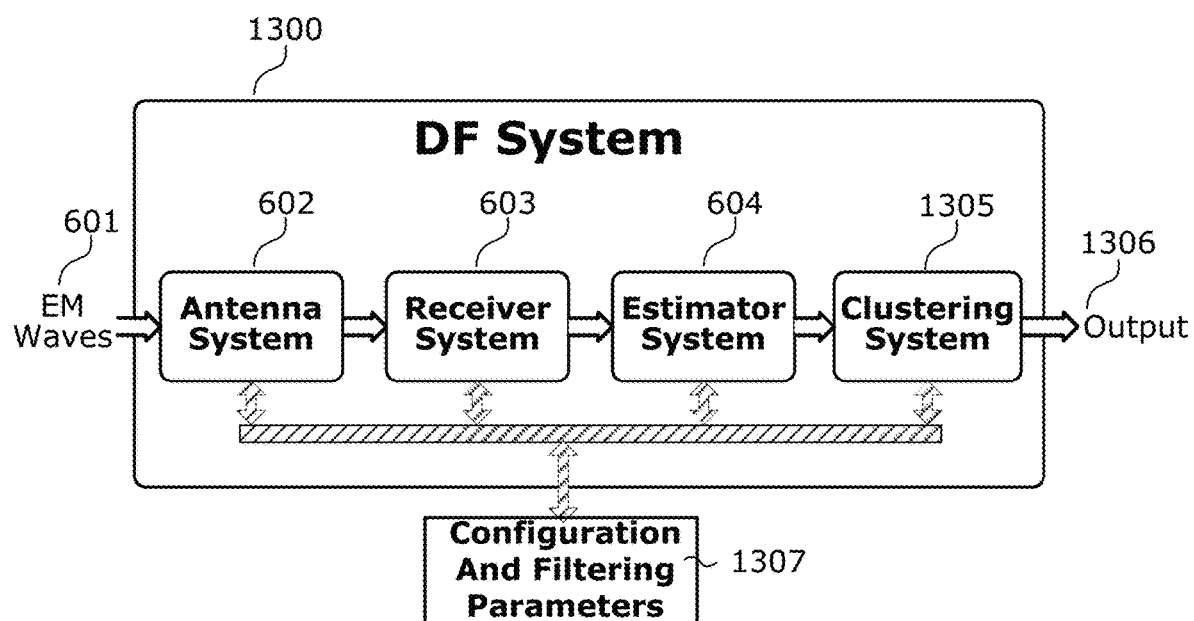
FIG. 13 is a functional block diagram of a DF system embodiment similar to the embodiment disclosed in connection with FIG. 6 but additionally including a clustering system according to one aspect of an embodiment.

The embodiment depicted in FIG. 13 is similar to that depicted in FIG. 6 but the DF system of FIG. 13 additional includes a clustering system 1305. The clustering system 1305 accepts a series of time stamped signal parameters, including AoA, magnitude, polarization, frequency, modulation type, and other metrics measured so as to pass the pre and post-estimation SoI defining parameters. The clustering system 1305 can derive an emitter's velocity and range by fitting a curve to an SoI's magnitude's rate of change and acceleration over time. Since the clustering system 1305 has multiple looks at an emitter, the clustering can improve the AoA estimation accuracy and reliability in that it can discard outliers and perform averaging. Having a priori knowledge of likelihoods that the SoI will be within a certain range of angles of arrival and likelihood that it is not in other ranges of AoA would also allow improved AoA estimation performance. The clustering system 1305 can group (or cluster) signals with a common AoA, or common AoA and polarization, allowing the clustering system 1305 to isolate different emitters using the same frequency band, and allowing it to group and identify the frequency hop sets used by different frequency hopping emitters, simplifying characterization and demodulation of hopping signals sent by a particular emitter.

The clustering system 1305 also allows classification of emitters, such as moving versus stationary, by features such as how its polarization changes over time such as its randomness or the range of frequencies its periodicity covers and the angular range over which it rotates. Configuration and filtering parameters 1307 add additional parameters to those in configuration and filtering parameters 607. The additional parameters configure the clustering system 1305 to optimize its performance under different operating scenarios. Configuration and filtering parameters 1307 include such things as how much time, or how many estimates from the estimator system 604 should the clustering system 1305 should use to perform its clustering functions. Configuration and filtering parameters 1307 can also include a priori probabilities that the SoI will be within a certain range of angles of arrival and probabilities that the SoI is not in other ranges of AoA mentioned above. Clustering system 1305 can also use configuration and filtering parameters 1307 to further isolate SoI from SoPI by filtering based on the addition parameters it generates. For example, parameters 1307 may specify to only pass emitters that are stationary, or only those that are moving, or only pass those that are frequency hopping emitters, or pass all frequency hopping emitters that do not use a certain set of hop frequencies, or a certain frequency hop sequence, or a certain set of hoping frequency parameters.

In some embodiments, the estimator system generates an estimated AoA by finding, for a set of signals of interest, the angles in the array manifold that would produce port voltages most closely matching, according to a matching metric, those from each signal of interest (SoI). Different embodiments use different matching metrics and or different signal models to optimize the AoA estimation accuracy. For example, an embodiment may model the signal as being a single wavefront (i.e. a signal with no multipath) with a priori known polarization. When the polarization matches the model, and the signal actually has no accompanying multipath, this embodiment is capable of giving superior estimates. Some embodiments may model the signal as having multipath, where the polarizations of all terms are unknown and are estimated as part of the AoA estimation optimization process. This model may often the best performing model for some applications because (1) handheld radios and mobile radios are not held to be vertical or horizontal, but sway, and (2) signals almost always have a ground bounce reflection, and if the ground is tilted, or if the reflection is from a dihedral formed by random boulder edges or the edge formed by a tree or building and the ground, the polarization will be rotated.

Besides signal models, matching metrics optimize different measures such as minimizing the mean square error (MMSE) (least squares), minimizing the maximum error (mini-max), finding what is most likely (maximum likelihood), and other error minimization norms like H-infinity norm. Neural net based approaches aim to achieve similar combinations of high accuracy and robust performance in a wide variety of situations. Embodiments using a neural network require training with a large number of Monte Carlo noise instantiations added to all AoA and polarization combinations for all possible combinations of multipath terms, for every frequency in the array manifold, and preferably, lots of measured data with accompanying high accuracy truth data. Ultimately, neural net based approaches simply require a lot of training data and compute time. Once trained, they may be able to run on processors suitably small for portable systems.

Besides the signal model and the different measures for what is being optimized, the matching performance is affected by biases in the estimation process. The estimator system may be capable of jointly estimating the bias along with the AoA, mag/phase, and polarization of an incoming signal, and as such, minimizing its impact.

The above operations and all operations described herein can be carried out by one or more components of digital electronic circuitry, computer hardware, firmware, and software. These can include one or more memories which can be read-only memory and/or random access memory. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM disks.

Implementations may also include one or more programmable processors, and one or more computer program products tangibly embodied in a machine-readable storage device for execution by one or more programmable processors. The one or more programmable processors can each execute a program of instructions to perform desired functions by operating on input data and generating appropriate output. Generally, the processors receive instructions and data from the memory. Any of the foregoing may be supplemented by, or incorporated in, specially designed ASICs (application-specific integrated circuits). These components may be physically centralized or be partially or wholly distributed throughout the embodiment.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the present invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A DF system having an output, the DF system comprising:
    an antenna system comprising at least two ports that sense emissions from an RF emitter;
    a receiving system; and
    an estimator system,
    wherein the antenna system is configured to output a signal from each of its at least two ports and sense a combination of one or more E-field signals and one or more H-field signals from the RF emitter, in a common volume of space,
    the antenna system comprising M conductive pieces with N ports, each port having two terminals attached to different ones of the two or more conductive pieces,
    wherein each conductive piece attaches to a terminal from two or more ports, [and]
    wherein the volume of space enclosed by a current loop through the N ports and two conductive pieces, is in common with the volume of space holding an electric charge between the M conductive pieces, and
    wherein the estimator system comprises at least two parallel processors in parallel, and wherein each processor is tasked to run vectorized operations.

2. The DF system as claimed in claim 1 wherein the receiving system accepts signals from the N ports and outputs a group of signals of interest, each signal of interest having of a set of outputs corresponding to the antenna system's N ports, to the estimator system, at least one of the receiving system and the estimator system being configured to pass signals of interest and reject other signals.

3. The DF system as claimed in claim 2 wherein the group of signals of interest includes a multipath term as a separate SOI.

4. The DF system as claimed in claim 3 wherein the estimator system comprises a neural network trained using the array manifold.

5. The DF system as claimed in claim 2 wherein the estimator system is adapted to accept the group of signals of interest output by the receiving system and to have access to an array manifold for the signals it accepts, and is further adapted to generate an estimated angle-of-arrival (AoA) by finding, for each signal of interest in the group, at least one of the angle in the array manifold that has port voltages most closely matching, according to a matching metric, those from a signal of interest and an estimated range based on how the magnitude of the signal of interest changes, or how the estimated AoA changes, when the DF system and RF emitter move relative to each other over time.

6. The DF system as claimed in claim 1 wherein an output of the DF system communicates at least one of an angle and a range between the antenna system and the RF emitter, as generated by the estimator system.

7. The DF system as claimed in claim 1 wherein at least one of the receiving system and the estimator system have an input arranged to accept a set isolation parameters including at least one of frequency, frequency set, bandwidth, time duration, time of occurrence, repetition rate, polarization, modulation type, so as to be easily re-configurable.

8. The DF system as claimed in claim 1 wherein the estimator system generates an estimated angle-of-arrival (AoA) by finding, for a set of signals of interest, one or more angles in the array manifold that would produce port voltages most closely matching, according to a matching metric, those from the set of signals of interest.

9. The DF system as claimed in claim 1 wherein the estimator system is adapted to use an array manifold and a matching process.

10. The DF system as claimed in claim 1 wherein the estimator system is adapted to estimate the AoA, magnitude, and polarization, for two or more multipath waves.

11. The DF system as claimed in claim 1 wherein the estimator system is adapted to correct for bias.

12. The DF system as claimed in claim 1 wherein the estimator system is adapted to correct for bias by arranging for the bias to be estimated as part of the estimating of the AoA, magnitude, and polarization, for each term of a signal arriving from one or more paths.

13. The DF system as claimed in claim 1 wherein the estimator system is adapted to correct for bias by using a reference signal.

* * * * *